(12) United States Patent
Yao et al.

(10) Patent No.: US 12,160,300 B2
(45) Date of Patent: Dec. 3, 2024

(54) METHOD AND APPARATUS FOR TUNING RADIO BEAM

(71) Applicant: Telefonaktiebolaget LM Ericsson (publ), Stockholm (SE)

(72) Inventors: Yong Yao, Nanjing (CN); Qi Liu, Nanjing (CN); Dongdong Huang, Nanjing (CN); Yu Chen, Nanjing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 18/001,785

(22) PCT Filed: Jun. 15, 2020

(86) PCT No.: PCT/CN2020/096104
§ 371 (c)(1),
(2) Date: Dec. 14, 2022

(87) PCT Pub. No.: WO2021/253159
PCT Pub. Date: Dec. 23, 2021

(65) Prior Publication Data
US 2023/0239030 A1    Jul. 27, 2023

(51) Int. Cl.
*H04B 7/06* (2006.01)
*H04W 16/28* (2009.01)

(52) U.S. Cl.
CPC .......... *H04B 7/0695* (2013.01); *H04W 16/28* (2013.01)

(58) Field of Classification Search
CPC .............................. H04B 7/0695; H04W 16/28
See application file for complete search history.

(56) References Cited

U.S. PATENT DOCUMENTS

| | | | |
|---|---|---|---|
| 2013/0143592 A1 | 6/2013 | Brisebois et al. | |
| 2014/0113544 A1* | 4/2014 | Topping | H04B 7/18543 455/3.01 |

(Continued)

FOREIGN PATENT DOCUMENTS

| | | | | |
|---|---|---|---|---|
| CN | 106688195 A | | 5/2017 | |
| EP | 3273715 A1 * | | 1/2018 | ............ H04W 16/18 |

(Continued)

OTHER PUBLICATIONS

International Search Report and Written Opinion issued in International Application No. PCT/CN2020/096104 dated Mar. 17, 2021 (8 pages).

(Continued)

*Primary Examiner* — Freshteh N Aghdam
(74) *Attorney, Agent, or Firm* — Rothwell, Figg, Ernst & Manbeck, P.C.

(57) ABSTRACT

Embodiments of the present disclosure provide methods and apparatus for tuning a plurality of beams. A method performed at a network node may comprise: determining (S101) a respective coverage requirement for a plurality of beams; determining (S102) a respective coverage area for the plurality of beams, based on the determined coverage requirement; determining (S103) a power requirement for the plurality of beams, based at least on the determined coverage area; and tuning (S104) at least one of the plurality of the beams, based at least on the determined power requirement. The energy efficiency and the network capacity may be improved, while the shape of each beam could be adaptively refactored.

20 Claims, 17 Drawing Sheets

(56) References Cited

U.S. PATENT DOCUMENTS

| | | | |
|---|---|---|---|
| 2015/0327079 A1 | 11/2015 | Wu et al. | |
| 2017/0250746 A1 | 8/2017 | Wang et al. | |
| 2020/0044722 A1 | 2/2020 | Yu et al. | |
| 2020/0169895 A1* | 5/2020 | Chen | G06N 3/045 |
| 2020/0413268 A1* | 12/2020 | Yerramalli | H04W 72/046 |

FOREIGN PATENT DOCUMENTS

| | | | |
|---|---|---|---|
| WO | 2017/048161 A1 | 3/2017 | |
| WO | 2017/211430 A1 | 12/2017 | |
| WO | WO-2018191892 A1 * | 10/2018 | H04B 7/04 |
| WO | 2019/125255 A1 | 6/2019 | |
| WO | 2020/055408 A1 | 3/2020 | |
| WO | 2020/109872 A1 | 6/2020 | |

OTHER PUBLICATIONS

Cao, Xi, et. al., Draft new Recommendation ITU-T Y.3173 (formerly Y.ML-IMT2020—Intelligence-level), "Framework for evaluating intelligence level in future networks including IMT-2020", ITU, Oct. 2019 (26 pages).

Qi Sun et al., Draft new Supplement 55 to ITU-T Y.3170-series (formerly ITU-T Y.ML-IMT2020-Use-Cases): "Machine learning in future networks including IMT-2020: use cases", ITU, Oct. 2019 (60 pages).

3GPP TS 38.300 V16.0.0 (Dec. 2019), 3rd Generation Partnership Project; Technical Specification Group Radio Access Network; NR; NR and NG-RAN Overall Description; Stage 2 (Release 16), Dec. 2019 (101 pages).

Jason Brownlee, "Stacked Long Short-Term Memory Networks", Machine Learning Mastery, Aug. 2017 (7 pages).

ITU-T, Telecommunication Standardization Sector of ITU, Y.3173, "Series Y: Global Information Infrastructure, Internet Protocol Aspects, Next-Generation Networks, Internet of Things and Smart Cities", Future networks, Framework for evaluating intelligence levels of future networks including IMT-2020, Feb. 2020 (34 pages).

* cited by examiner

METHOD AND APPARATUS FOR TUNING RADIO BEAM

CROSS REFERENCE TO RELATED APPLICATIONS

This application is a 35 U.S.C. § 371 National Stage of International Patent Application No. PCT/CN2020/096104, filed 2020 Jun. 15.

TECHNICAL FIELD

The present disclosure relates generally to the technology of wireless communication, and in particular, to a method and an apparatus for tuning radio beam.

BACKGROUND

This section introduces aspects that may facilitate better understanding of the present disclosure. Accordingly, the statements of this section are to be read in this light and are not to be understood as admissions about what is in the prior art or what is not in the prior art.

Future communication systems, such as $5^{th}$ generation (5G) and beyond $5^{th}$ generation (B5G) etc., are desired to enable a truly Networked Society, in which information can be accessed and data can be shared, anywhere and anytime, by anyone and anything.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

There are main challenges that need to be addressed by such communication systems, such as a massive growth in the number of connected devices, a massive growth in traffic volume, etc. For such massive connected devices and massive traffic volume, the network energy efficiency and area traffic capacity are more and more important in such networks, and thus better methods are desired to improve these key performance indicator (KPI) in network radio (NR).

Conventionally, beamforming and beam management are proposed. The beamforming capability is used to extend coverage and also to increase the system capacity by enabling high spatial resolution multi-layer transmissions. Additionally, beam management manner, such as beam tracking is introduced for improvements, e.g. beam switching based mobility.

However, under such schemes, the network side usually has to consume more energy for supporting a high potential capacity. The network energy efficiency will be affected.

Certain aspects of the present disclosure and their embodiments may provide solutions to these or other challenges. There are, proposed herein, various embodiments which address one or more of the issues disclosed herein. An improved mechanism of smart RAN/beam tuning in order to achieve adaptive network capacity and network energy efficiency is provided.

A first aspect of the present disclosure provides a method performed at a network node, comprising: determining a respective coverage requirement for a plurality of beams; determining a respective coverage area for the plurality of beams, based on the determined coverage requirement; determining a power requirement for the plurality of beams, based at least on the determined coverage area; and tuning at least one of the plurality of the beams, based at least on the determined power requirement.

In embodiments of the present disclosure, the coverage requirement comprises a traffic load to be supported by the at least one of the plurality of beams; and the traffic load is determined by a prediction based on historic data.

In embodiments of the present disclosure, the prediction is made by an artificial intelligence algorithm.

In embodiments of the present disclosure, the prediction is made by Long Short-Term Memory, LSTM, neural network model.

In embodiments of the present disclosure, the traffic load is determined, based on a mapping relationship between the traffic load and a plurality of output parameters of the LSTM neural network model.

In embodiments of the present disclosure, the output parameters of the LSTM neural network model comprise at least one of: a utilization of physical resource block, PRB, a number of radio resource control, RRC, connections, or a throughput.

In embodiments of the present disclosure, a number of input parameters of the LSTM neural network model is not less than a number of output parameters of the LSTM neural network model.

In embodiments of the present disclosure, the plurality of beams are associated with a plurality of geographic grids covered by the network node; and the respective coverage requirement for a plurality of beams is determined in the plurality of geographic grids; the respective coverage area for a beam of the plurality of beams comprises at least one geographic grid requiring a coverage of the beam. Determining a power requirement for the plurality of beams, based at least on the coverage area comprises: determining an outside edge grid of the respective coverage area for the plurality of beams; and determining the power requirement, based on a mapping relationship between the outside edge grid and the power requirement.

In embodiments of the present disclosure, the power requirement is determined based at least on the outside edge grid, an amount of connected terminal devices, and positions of the connected terminal devices.

In embodiments of the present disclosure, the power requirement is determined to at least be able to cover both of the outside edge grid and the connected terminal devices.

In embodiments of the present disclosure, the network node is a macro base station in a heterogeneous network, HetNet; the plurality of the beams are generated by at least one of superposed base stations which are managed by the macro base station.

In embodiments of the present disclosure, the plurality of the beams are tuned for a beam recovery procedure.

A second aspect of the present disclosure provides a network node, comprising: a processor; and a memory, the memory containing instructions executable by the processor, whereby the network node is operative to: determine a respective coverage requirement for a plurality of beams; determine a respective coverage area for the plurality of beams, based on the determined coverage requirement; determine a power requirement for the plurality of beams, based at least on the determined coverage area; and tune at least one the plurality of the beams, based at least on the determined power requirement.

In embodiments of the present disclosure, the network node is operative to perform the method according to any embodiments of the present disclosure.

A third aspect of the present disclosure provides a computer-readable storage medium storing instructions which when executed by at least one processor, cause the at least one processor to perform the method according to any embodiments of the present disclosure.

A fourth aspect of the present disclosure provides a network node comprising: a first determination unit, configured to determine a respective coverage requirement for a plurality of beams; a second determination unit, configured to determine a respective coverage area for the plurality of beams, based on the determined coverage requirement; a third determination unit, configured to determine a power requirement for the plurality of beams, based at least on the determined coverage area; and a tuning unit, configured to tune at least one the plurality of the beams, based at least on the determined power requirement.

In embodiments of the present disclosure, the network node is operative to perform the method according to any of the above embodiments.

Embodiments herein afford many advantages. According to embodiments of the present disclosure, at least one of the plurality of the beams is tuned based on the determined power requirement. That is, the beams may be tuned adaptively according to actual power requirement, which could be fluctuating over time, rather than be always maintained at a high power lever for potential massive connected devices and massive traffic volume. The energy efficiency may be improved.

BRIEF DESCRIPTION OF DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

Figure 1A:
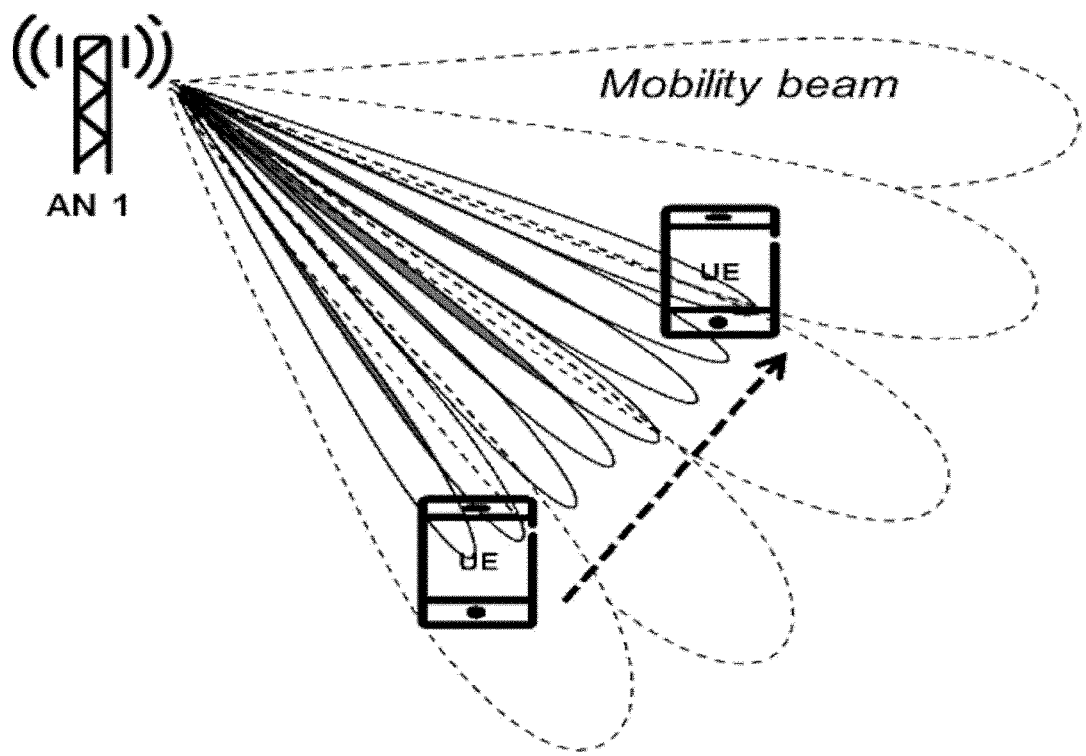
FIG. 1A is an exemplary diagram showing Beamforming and Beam Switching Mobility.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

As used herein, the term "network" or "communication network" refers to a network following any suitable wireless communication standards. For example, the wireless communication standards may comprise new radio (NR), long term evolution (LTE), LTE-Advanced, wideband code division multiple access (WCDMA), high-speed packet access (HSPA), Code Division Multiple Access (CDMA), Time Division Multiple Address (TDMA), Frequency Division Multiple Access (FDMA), Orthogonal Frequency-Division Multiple Access (OFDMA), Single carrier frequency division multiple access (SC-FDMA) and other wireless networks. In the following description, the terms "network" and "system" can be used interchangeably. Furthermore, the communications between two devices in the network may be performed according to any suitable communication protocols, including, but not limited to, the wireless communication protocols as defined by a standard organization such as 3rd generation partnership project (3GPP) or the wired communication protocols.

The term "network node" used herein refers to a network device or network entity or network function or any other devices (physical or virtual) in a communication network. For example, the network node in the network may include a base station (B S), an access point (AP), a multi-cell/multicast coordination entity (MCE), a server node/function (such as a service capability server/application server, SCS/AS, group communication service application server, GCS AS, application function, AF), an exposure node/function (such as a service capability exposure function, SCEF, network exposure function, NEF), a unified data management, UDM, a home subscriber server, HSS, a session management function, SMF, an access and mobility management function, AMF, a mobility management entity, MME, a controller or any other suitable device in a wireless communication network. The BS may be, for example, a node B (NodeB or NB), an evolved NodeB (eNodeB or eNB), a next generation NodeB (gNodeB or gNB), a remote radio unit (RRU), a radio header (RH), a remote radio head (RRH), a relay, a low power node such as a femto, a pico, and so forth.

Yet further examples of the network node may comprise multi-standard radio (MSR) radio equipment such as MSR BSs, network controllers such as radio network controllers (RNCs) or base station controllers (BSCs), base transceiver stations (BTSs), transmission points, transmission nodes, positioning nodes and/or the like. Further, the term "network node" may also refer to any suitable function which can be implemented in a network entity (physical or virtual) of a communication network. For example, the 5G system (5GS) may comprise a plurality of NFs such as AMF (Access and mobility Function), SMF (Session Management Function), AUSF (Authentication Service Function), UDM (Unified Data Management), PCF (Policy Control Function), AF (Application Function), NEF (Network Exposure Function), UPF (User plane Function) and NRF (Network Repository Function), RAN (radio access network), SCP (service communication proxy), etc. In other embodiments, the network function may comprise different types of NFs (such as PCRF (Policy and Charging Rules Function), etc.) for example depending on the specific network.

The term "terminal device" refers to any end device that can access a communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, a portable computer, an image capture terminal device such as a digital camera, a gaming terminal device, a music storage and a playback appliance, a mobile phone, a cellular phone, a smart phone, a voice over IP (VoIP) phone, a wireless local loop phone, a tablet, a wearable device, a personal digital assistant (PDA), a portable computer, a desktop computer, a wearable terminal device, a vehicle-mounted wireless terminal device, a wireless endpoint, a mobile station, a laptop-embedded equipment (LEE), a laptop-mounted equipment (LME), a USB dongle, a smart device, a wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3GPP, such as 3GPP' LTE standard or NR standard. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the communication network. Instead, a UE may represent a device that is intended for sale to, or operation by, a human user but that may not initially be associated with a specific human user.

As yet another example, in an Internet of Things (IoT) scenario, a terminal device may represent a machine or other device that performs monitoring and/or measurements, and transmits the results of such monitoring and/or measurements to another terminal device and/or network equipment. The terminal device may in this case be a machine-tomachine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

As used herein, the phrase "at least one of A and (or) B" should be understood to mean "only A, only B, or both A and B." The phrase "A and/or B" should be understood to mean "only A, only B, or both A and B."

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

It is noted that these terms as used in this document are used only for ease of description and differentiation among nodes, devices or networks etc. With the development of the technology, other terms with the similar/same meanings may also be used.

In the following description and claims, unless defined otherwise, all technical and scientific terms used herein have the same meaning as commonly understood by one of ordinary skills in the art to which this disclosure belongs.

FIG. 1A is an exemplary diagram showing Beamforming and Beam Switching Mobility.

With the beamforming, one access network node AN1 may generate a plurality of beams with predetermined spatial direction. These beams cover different geographic areas. The usage of beamforming and beam management is a fundamental part of RAN in some communication systems, such as 5G/B5G. Beam management is the base of NR, the beam serving for UEs are identified by beam ID, and several beams form the beam set for cell coverage.

Beamforming alone is not enough to meet 5G/B5G requirements, the beam tracking is also introduced for improvements, e.g. beam switching based mobility. When a UE moves from one coverage area to another, the connection between the UE and the access network node may be kept while the utilized beam may in fact be switched from one to another.

However, the energy efficiency may be a big challenge since many beams have to be always maintained with a high power level, for a possible large number of UEs.

Figure 1B:
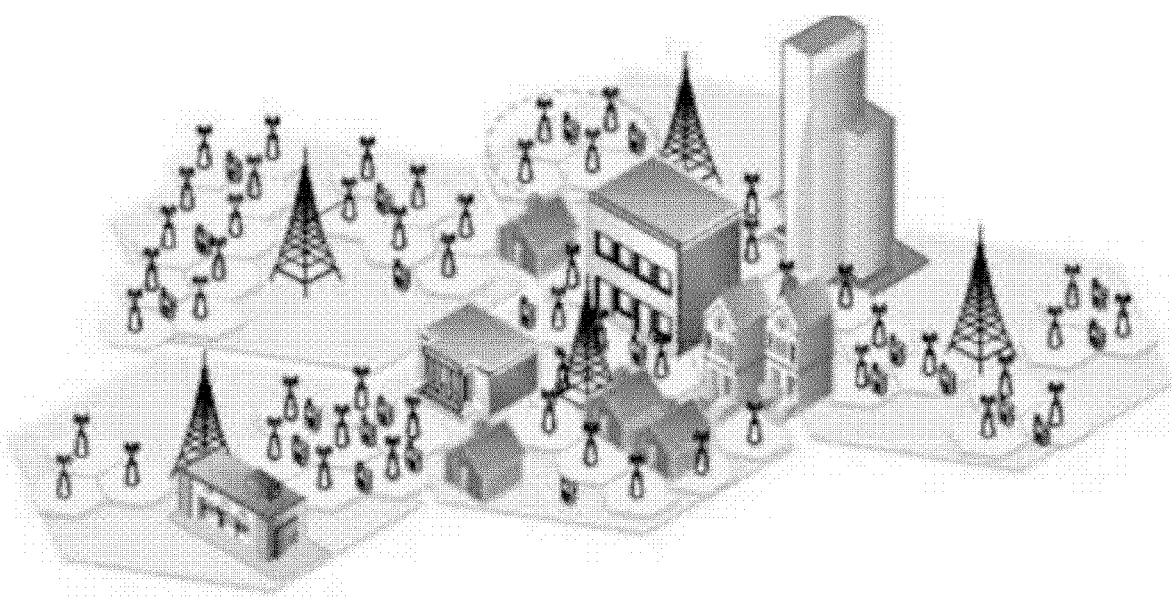
FIG. 1B is an exemplary diagram showing a HetNet.

FIG. 1B is an exemplary diagram showing a HetNet.

As shown in FIG. 1B, the macro cell (such as the bigger tower in FIG. 1B) in HetNet is the line of defense for coverage (bigger hexagons), while the superposed cells are deployed for capacity enhancement, e.g. mmWave cells (smaller hexagons).

In such HetNet (Heterogeneous Network), energy efficiency issue may be more critical. In most of time, the UEs may not be distributed equally in each superposed cell, but all the superposed cells have to always provide a relatively high power level, for potential large number of UEs.

The embodiments of the present disclosure focus on a mechanism of smart RAN/beam tuning, in order to achieve adaptive network capacity and network energy efficiency for requirements in communication systems, such as in 5G/B5G.

Figure 2A:
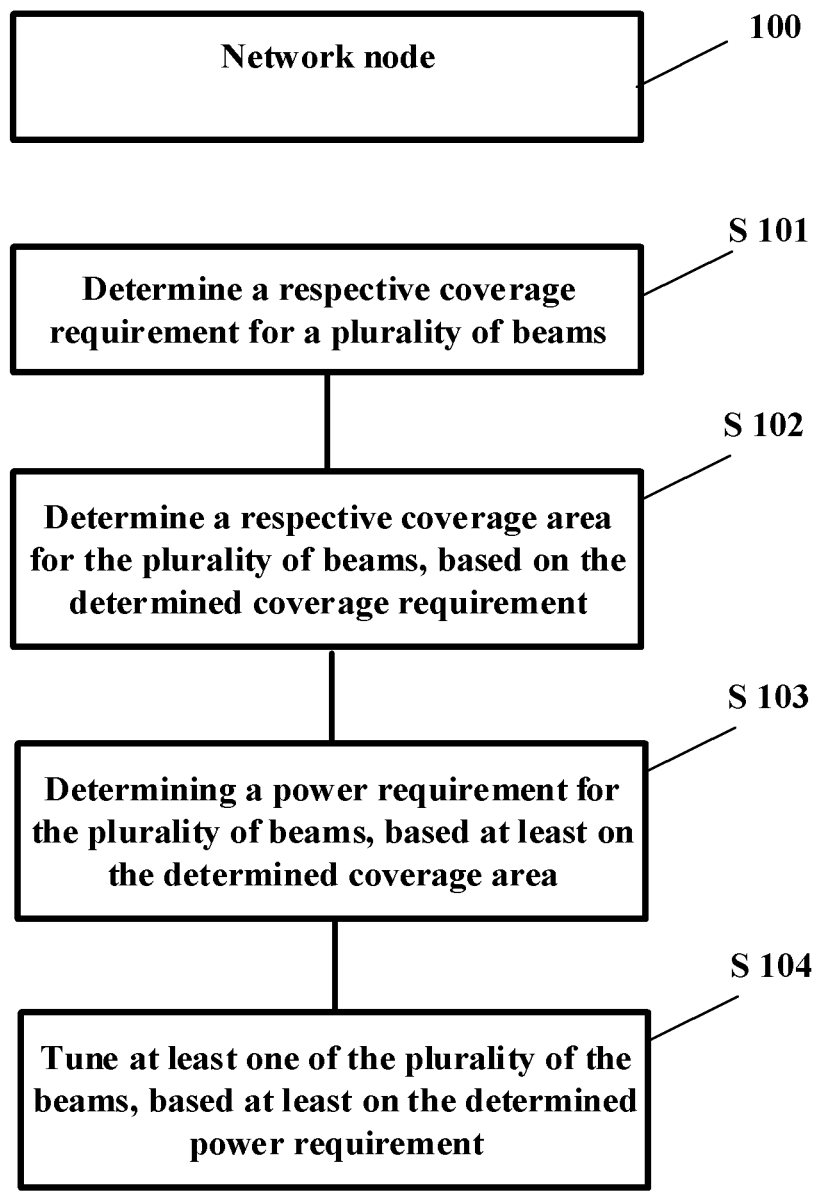
FIG. 2A is an exemplary flowchart of a method performed at a network node, according to embodiments of the present disclosure.

FIG. 2A is an exemplary flowchart of a method performed at a network node, according to embodiments of the present disclosure.

As shown in FIG. 2A, the method performed at a network node may comprise: S101, determining a respective coverage requirement for a plurality of beams; S102, determining a respective coverage area for the plurality of beams, based on the determined coverage requirement; S103, determining a power requirement for the plurality of beams, based at least on the determined coverage area; and S104, tuning at least one of the plurality of the beams, based at least on the determined power requirement.

According to embodiments of the present disclosure, at least one of the plurality of the beams is tuned based on the determined power requirement. That is, the beams may be tuned adaptively according to actual power requirement, which could be fluctuating over time, rather than be always maintained at a high power lever for potential massive connected devices and massive traffic volume. The energy efficiency may be improved.

In embodiments of the present disclosure, the coverage requirement comprises a traffic load to be supported by the at least one of the plurality of beams; and the traffic load is determined by a prediction based on historic data.

According to embodiments of the present disclosure, a prediction manner may be used when the change of the coverage requirement is caused by UEs moving among different zones, since for many coverage districts, the traffic load in such situation is regular and predictable. Thus, the traffic load change by UE fluxion could be leveraged by adaptive beam/cell coverage tuning.

Figure 2B:
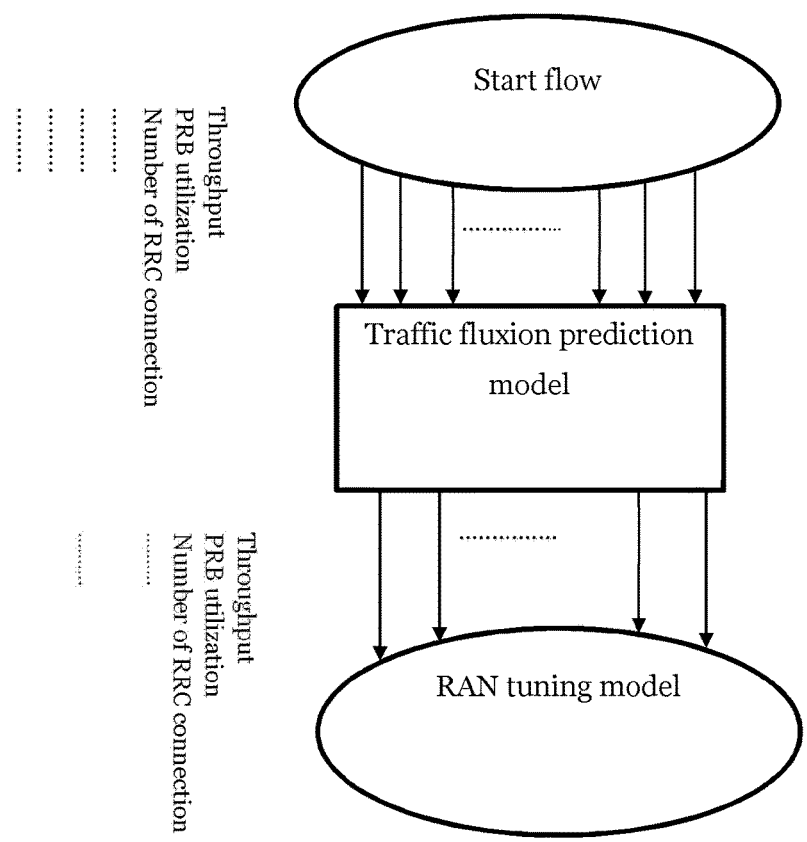
FIG. 2B is an exemplary diagram showing main models used by the method shown in FIG. 2A, according to embodiments of the present disclosure.

FIG. 2B is an exemplary diagram showing main models used by the method shown in FIG. 2A, according to embodiments of the present disclosure.

As shown in FIG. 2B, after the flow of the method starts, a plurality of historic and/or current parameters are input into the prediction model, particularly a traffic fluxion prediction model, for predicting the future traffic load (i.e. the fluxion of the traffic load over time). Then prediction results are output into the RAN tuning model, for tuning the RAN beams based on the prediction results.

In embodiments of the present disclosure, the input/output parameters of the prediction model comprise at least one of: a utilization of physical resource block, PRB, a number of radio resource control, RRC, connections, or a throughput.

In embodiments of the present disclosure, a number of input parameters of the prediction model is not less than a number of output parameters of the prediction model. That is, relatively more input parameters may improve the prediction accuracy.

In embodiments of the present disclosure, the traffic load is determined, based on a mapping relationship between the traffic load and a plurality of output parameters of the prediction model.

According to the principle of minority obeying majority, different output values of 5G/B5G traffic load data may be mapped to one traffic load level. And bellow table 1 shows how to be mapping to a traffic load with four levels bases on three traffic load parameters.

TABLE 1

| mapping table | | | |
| --- | --- | --- | --- |
| PRB utilization | number of RRC connection | throughput | Traffic load level |
| H | H | H | H |
| H | H | M | H |
| H | H | L | H |
| H | H | Z | H |
| H | M | H | H |
| H | M | M | M |
| H | M | L | M |
| H | M | Z | M |
| H | L | H | H |
| H | L | M | M |
| H | L | L | L |
| H | L | Z | L |
| H | Z | H | H |
| H | Z | M | M |
| H | Z | L | L |
| H | Z | Z | Z |
| M | H | H | H |
| M | H | M | M |
| M | H | L | M |
| M | H | Z | M |
| M | M | H | M |
| M | M | M | M |
| M | M | L | M |
| M | M | Z | M |
| M | L | H | M |
| M | L | M | M |
| M | L | L | L |
| M | L | Z | L |
| M | Z | H | M |
| M | Z | M | M |
| M | Z | L | L |
| M | Z | Z | Z |
| L | H | H | H |
| L | H | M | M |
| L | H | L | L |
| L | H | Z | L |
| L | M | H | M |
| L | M | M | M |
| L | M | L | L |
| L | M | Z | L |
| L | L | H | L |
| L | L | M | L |
| L | L | L | L |
| L | L | Z | L |
| L | Z | H | L |
| L | Z | M | L |
| L | Z | L | L |
| L | Z | Z | Z |
| Z | H | H | H |
| Z | H | M | M |
| Z | H | L | L |
| Z | H | Z | Z |
| Z | M | H | M |
| Z | M | M | M |
| Z | M | L | L |
| Z | M | Z | Z |
| Z | L | H | L |
| Z | L | M | L |
| Z | L | L | L |
| Z | L | Z | Z |
| Z | Z | H | Z |
| Z | Z | M | Z |
| Z | Z | L | Z |
| Z | Z | Z | Z |

H means high, M means medium, L means low, and Z means zero. It should be understood any other number of levels may also be utilized, such as 3, or 5, or etc. Further, the specific parameter value range corresponding to each level may be predetermined.

It should be understood that any other principle may also be utilized. For example, the level of the traffic load level may equal to a highest level of the three parameters, for ensuring the service for UE, but with more power consuming.

It should be understood that the training and prediction model input and output parameters may use above network parameters coving L1 (PRB utilization), Number of RRC connections (L3), Throughput(L1/L2), but not limited to this. Other performance parameters, e.g. average Hybrid Automatic Repeat request (HARD) retransmission amount and Rate (L2); Active UE numbers, with data to be transmitted (L2/L3); measured Noise and Interference Power on Physical Uplink Control Channel (PUCCH) (Unit: 1 dBm/PRB, L1); Path loss distribution (L1/2); L1 DSP load and L1 latency.

The output of the prediction model may be further input to the RAN tuning model to tune the RAN beams.

Further, the prediction model may have a loop feedback structure, which enable the model to adjust itself by continuously collect the error between the prediction value and the actual measured value.

In some embodiments of the present disclosure, mainly the beams refactoring could be the key for RAN tuning. For example, the beam's coverage could be scaled according to traffic fluxion prediction result. That is, when an area is predicted to have no UE to be served, a corresponding beam may be shrunk to not cover this area in a certain period, and vice versa.

As an optimization way, the synergy within the sites of RAN will benefit the RAN tuning. Coordinator (e.g. Macro) cells collect the shrink of beams, once the traffic is growing up quickly, the coordinator needs to notify cells with beams shrunken. The coordinator cell may try to collect load information of relevant RAN cells with Xn/X2 connection, and the information will be used to assist candidate tuning cell to do be beam tuning. The Xn/X2 message or use private message could be defined. For the deployment cases of Cloud RAN or regular RAN, the Core Network is another way to share the load information with candidate tuning cell via S1/NGC connection.

Figure 3A:
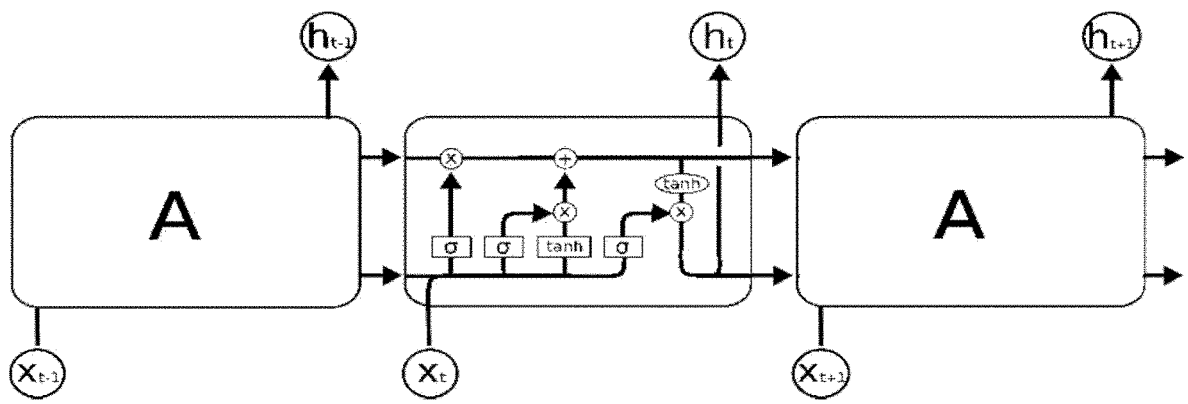
FIG. 3A is an exemplary block diagram showing LSTM framework, which may be utilized by the method according to embodiments of the present disclosure.

FIG. 3A is an exemplary block diagram showing LSTM framework, which may be utilized by the method according to embodiments of the present disclosure.

In embodiments of the present disclosure, the prediction is made by an artificial intelligence algorithm.

According to embodiments of the present disclosure, by artificial intelligence algorithm, a relatively more accurate prediction may be made, since the UE fluxion may be caused by many reasons which cannot be expressed by simple mathematic equations.

In embodiments of the present disclosure, the prediction is made by Long Short-Term Memory, LSTM, neural network model.

For an example without limitation, here the LSTM is used to make traffic prediction, of course, other models can also be used, such as Arima machine learning model, or reinforcement learning, etc.

LSTMs have chain-like structure as shown in FIG. 3A, but the repeating module may have a different structure. Instead of having a single neural network layer, there are four layers, which are interacting in a very special way.

A means LSTM cell. Each A is the FIG. 3A has the same structure. X means input_dim mapping to Vector X. h means output of LSTM CELL. + means plus calculation. × means multiple calculation. σ, and tan h mean inspirit function of LSTM nerval network. t,t−1, t+1 mean timepoints.

LSTM Input layer may be presented as (batch_size, time_steps, input_dim), input_dim maps to Vector X, time_steps indicates the sampling interval between t−1:t:t+1, LSTM Output layer: (batch_size, time_steps, output_dim) is the similar mapping case.

The key to LSTMs is the cell state, which is represented by the horizontal line running through the top of the diagram. The cell state is kind of a conveyor belt. It runs straight down the entire chain, with only some minor linear interactions. It's very easy for information to just flow along this line unchanged. LSTM has the "gate", which controls the amount of information passing through it. This gate function is essentially a sigma function. One of the most important features of this function is that it maps values on the real number line to (0,1), and most of the values are very close to 0 or 1.

This property is like a gate structure and depending on the value of the function how much information to pass through the gate may be determined.

In LSTM, there are three gate structures, namely forget gate, input gate and output gate. Below figure shows the mechanisms of LSTM one cell.

Figure 3B:
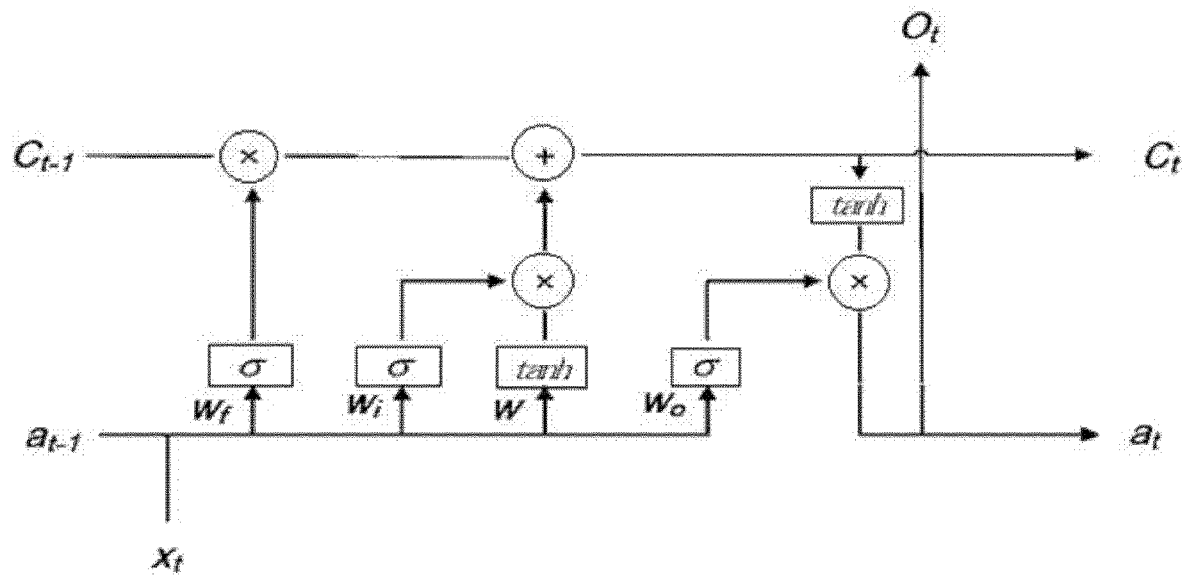
FIG. 3B is an exemplary block diagram showing a structure of one cell of LSTM framework, which may be utilized by the method according to embodiments of the present disclosure.

FIG. 3B is an exemplary block diagram showing a structure of one cell of LSTM framework, according to embodiments of the present disclosure.

As shown in FIG. 3B, $X_t$ is the new information added at this moment, $a_{t-1}$, $c_{t-1}$, are the previous information. From this figure, there are two output $a_t$ and $c_t$ for the successive cell $O_t$ (ht) means output of the cell at time t, including prediction results.

The information carried by $c_t$ is limited by the output gate and composed of the input of the current time, it contains more information of the current time. Comparing $a_t$ with $c_t$, $a_t$ has short-term memory and $c_t$ has long-term memory. So, such neural network is called as Long Short-Term Memory network.

$W_f$, $W_i$, $W$, $W_o$ mean different part of input parameters.

About 5G/B5G traffic load data, it may be considered as that the current time traffic load data is related not only to the previous state data, but also to the future state data. Thus, in order to get better prediction result with 5G/B5G traffic load data, LSTM model is selected.

Before the prediction model is used in the practical application, the prediction model may be trained. The aim of training is to find the suitable parameters of LSTM network model itself to predict accurately future data with historical data. And this LSTM model is used to find the relationship between previous days (M days) 5G traffic load data and the future days (N days) 5G traffic load data. One point to note is each previous day traffic load data called the sample data and it is a vector include L parameters (downlink PRB utilization/throughput/number of RRC connection and so on) related with 5G traffic load data. M, N, L are positive integers.

The more important thing is that the parameters of LSTM network model need periodically updated to adapt any changes during training process. It means that these parameters must be updated after each iteration training until the loss error is acceptable.

There are three LSTM model parameter lists with this LSTM model.

Input layer: (batch_size, time_steps, input_dim)
LSTM model input has three dimensions.
  (1) batch_size: the number of sample data.
  (2) time_steps: time steps of sample data
  (3) input_dim: dimensions of sample data
Intermediate layer: num_units
The number of LSTM units (cells) used to memorize the state of the LSTM network at past times.
Output layer: (batch_size, time_steps, output_dim)
  (1) batch_size: the number of sample data.
  (2) time_steps: time steps of sample data
  (3) output_dim: dimensions of output data For this scheme, two LSTM models are chosen, one for encoder and one for decoder. There are 50 neurons in each LSTM. Dropout is set as 0.7 and optimizer is set as ADAM and loss is set as Mean Squared Error (MSE). As one example, 60 epochs are trained and batch size is set as 3. Then 145 days data is then feed to the model.

After computing parameters, the train input shape is (68, 30, 63) and the train output shape is (68, 30, 3). 68 is train sample number, 30 days is time step, 63 is input feature number, 3 is output feature number.

Input feature may include mean Channel Quality Indication (CQI), RRC connect request number, Evolved Radio Access Bearer (E-RAB) establish successful number, downlink available PRB number, downlink PRB utilization, throughput, RRC connected number and so on. Output feature may include downlink PRB utilization, throughput and RRC connected number.

Below is example table of LSTM model parameter list.

TABLE 2

| LSTM model parameter list | | |
|---|---|---|
| Layer (type) | Output Shape | Param # |
| lstm_1 (LSTM) | (None, 50) | 22800 |
| dropout_1 (Dropout) | (None, 50) | 0 |
| repeat_vector_1 (RepeatVector) | (None, 30, 50) | 0 |
| lstm_2 (LSTM) | (None, 30, 50) | 20200 |
| dropout_2 (Dropout) | (None, 30, 50) | 0 |
| time_distributed_1 (TimeDist) | (None, 30, 3) | 153 |

Total params: 43,153
Trainable params: 43,153
Non-trainable params: 0

As shown in table 2, two LSTM models are utilized, one for encoder, and one for decoder. lstm_1, lstm_2 correspond to order numbers of the LSTMs. dropout_1, dropout_2 mean parameters configured to avoid over fitting in training, by activating or deactivating the corresponding neurons. repeat_vector_1 mean parameters, configured to indicate the difference length of the input sequence and the output sequence. time_distributed_1 means parameters for multiple time steps. As shown in table, different output shapes may be configured for these different layers.

Further, according to the principle of neural network, the validation set of data/parameters is used to verify the accuracy of the trained LSTM model. Validation set and training set are allocated according to a certain proportion.

According to a certain proportion, the validation set input shape may be (18, 30, 63) and output shape may be (18, 30, 3). 18 is validate sample number, 30 days is time step, 63 is input feature number, 3 is output feature number.

When the validation loss was smallest the model was saved.

Figure 3C:
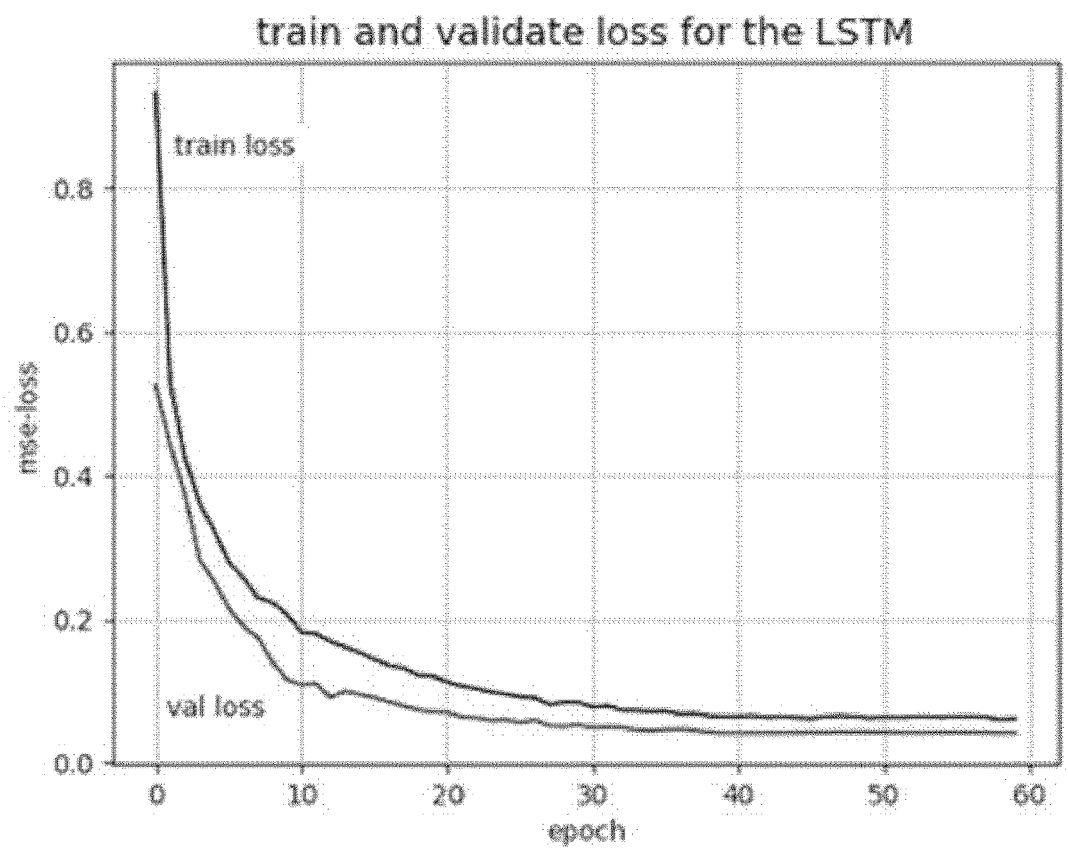
FIG. 3C is an exemplary diagram showing train loss and validate loss for the LSTM, according to embodiments of the present disclosure.

FIG. 3C is an exemplary diagram showing train loss and validate loss for the LSTM, according to embodiments of the present disclosure.

It can be seen from the FIG. 3C that, Loss of training set and validation set are convergent continuously. Loss of training set and validation set is lowest when epoch is 40. Loss is no longer convergent after 40 epochs, so the model is saved when epoch is 40.

Figure 3D:
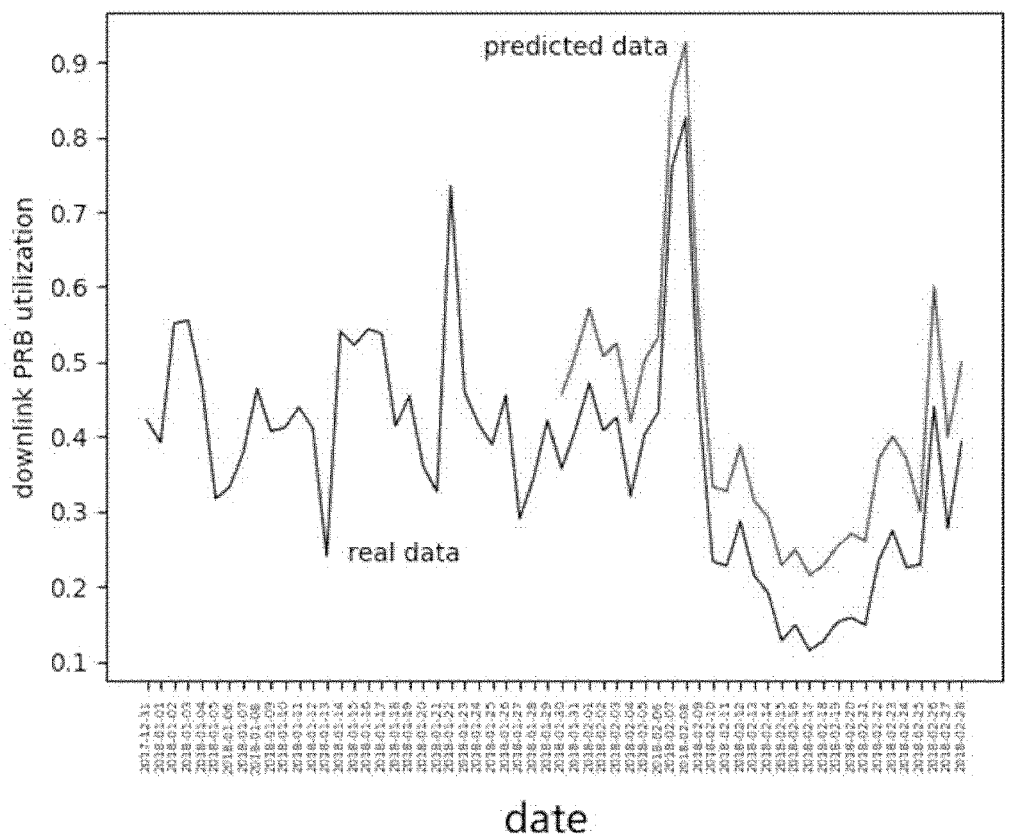
FIG. 3D is an exemplary diagram showing real data and the predicted data for the downlink PRB utilization, according to embodiments of the present disclosure.
Figure 3E:
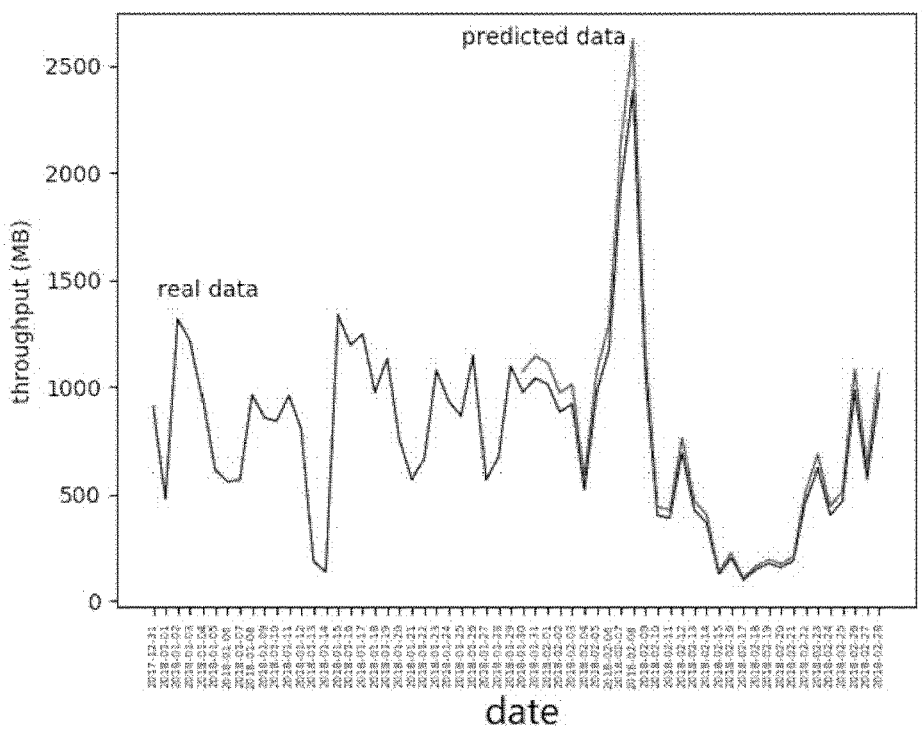
FIG. 3E is an exemplary diagram showing real data and the predicted data for the throughput, according to embodiments of the present disclosure.
Figure 3F:
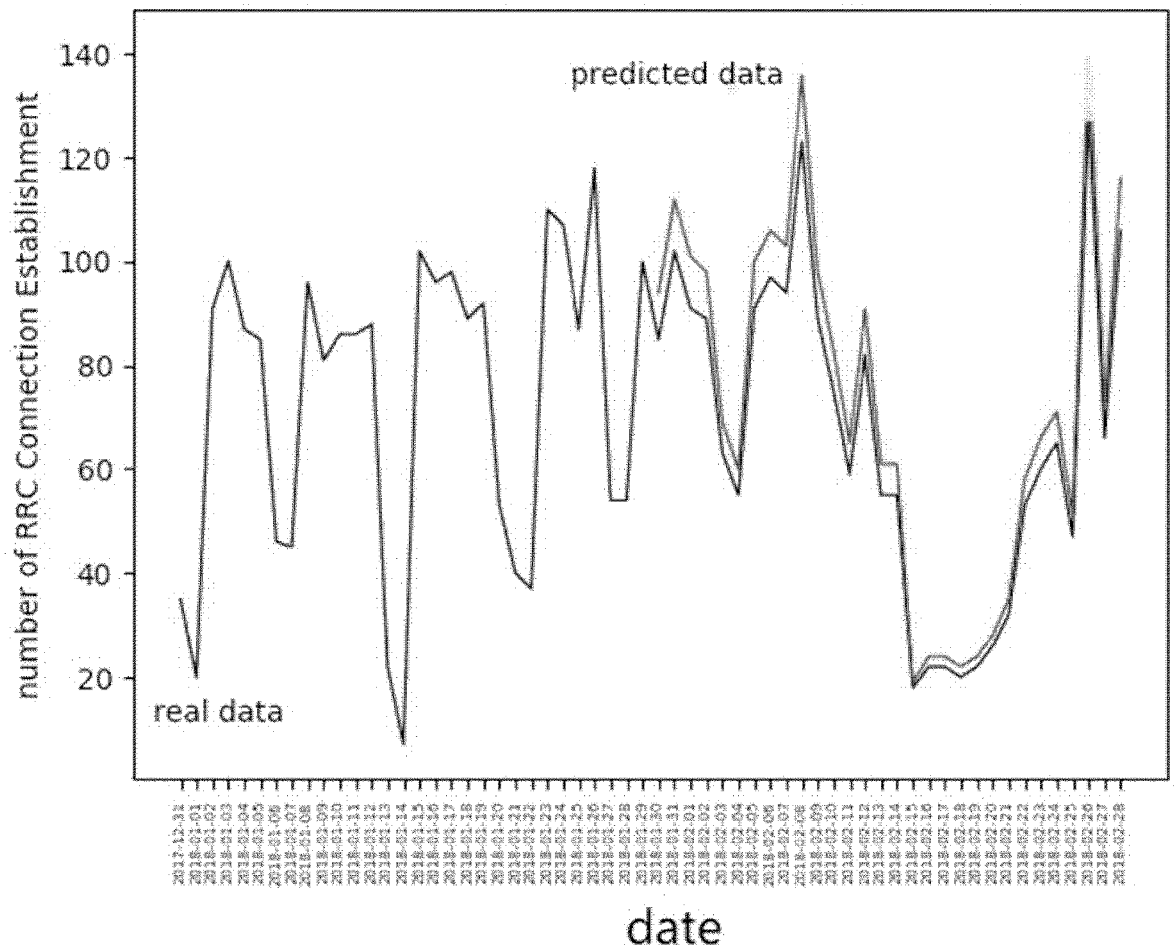
FIG. 3F is an exemplary diagram showing real data and the predicted data for the number of RRC connection establishment, according to embodiments of the present disclosure.

FIG. 3D is an exemplary diagram showing real data and the predicted data for the downlink PRB utilization, according to embodiments of the present disclosure;

FIG. 3E is an exemplary diagram showing real data and the predicted data for the throughput, according to embodiments of the present disclosure; FIG. 3F is an exemplary diagram showing real data and the predicted data for the number of RRC connection establishment, according to embodiments of the present disclosure.

In these figures, downlink PRB utilization and throughput and RRC connected number over the next 30 days are predicted. The long line is real data, and the short line is predicted data.

Based on the trained LSTM model, then prediction can be done with the input data. 30 days data set is input to predict future 30 days parameter include PRB utilization and throughput and RRC connected number.

So, prediction input shape may be (1, 30, 63) and output shape is (1, 30, 3). 1 is prediction sample number, 30 days is time step, 63 is input feature number, 3 is output feature number.

As shown in FIG. 3D, 3E, 3F, the prediction data is rather close to the real data. Therefore, by utilizing the prediction model, the coverage requirement, particularly the power requirement for beams may be previously determined. Then, the beams may be tuned in preparation for the coming traffic load. According to the embodiments of the present disclosure, any fluxion of traffic (e.g. suddenly rising or falling) may be prepared in advance. The service quality may be maintained while the power efficiency is improved.

Figure 4:
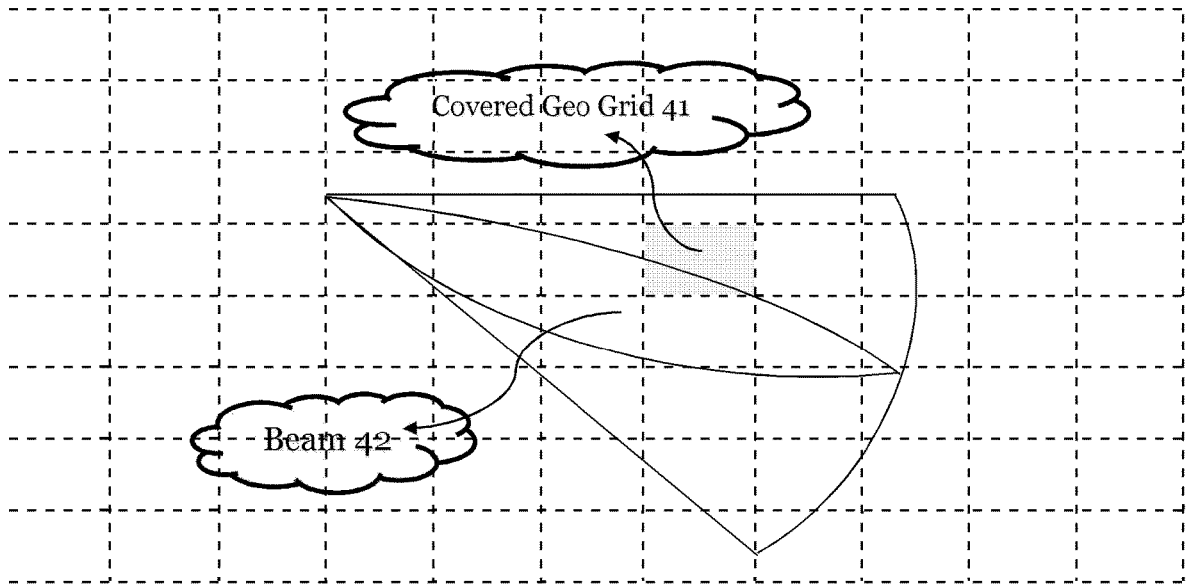
FIG. 4 is an exemplary diagram showing a beam covering a plurality of geographic grid, according to embodiments of the present disclosure.

FIG. 4 is an exemplary diagram showing a beam covering a plurality of geographic grid, according to embodiments of the present disclosure.

In embodiments of the present disclosure, the plurality of beams are associated with a plurality of geographic grids covered by the network node; and the respective coverage requirement for a plurality of beams is determined in the plurality of geographic grids; the respective coverage area for a beam of the plurality of beams comprises at least one geographic grid requiring a coverage of the beam.

As show in FIG. 4, in a cell (either macro cell or superposed cell), the coverage area may be divided to many geographic grids. One exemplary beam 42 may cover a plurality of geographic grids including the Geo Grid 41. That is to say, a possible coverage area of each beam may be further divided to a plurality of geographic grids.

The coverage requirement of the grids may be used for determining the tuning manner of the beams. For example, when more grids (and/or grids with longer distance) require the coverage of the beams 42, the power of the beams may be required as higher.

It should be understood that the specific shape and the number of the geographic grids may be predetermined according to the practical needs, and are not limited to FIG. 4.

Figure 5:
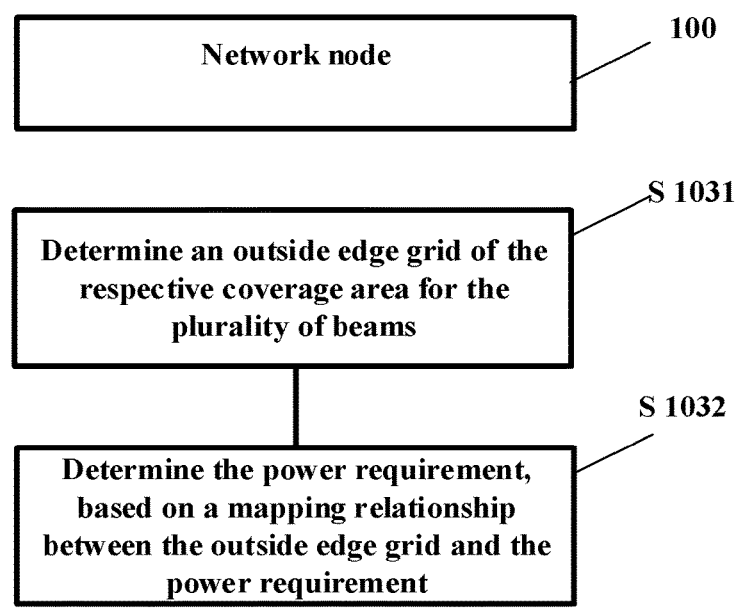
FIG. 5 is an exemplary flowchart illustrating additional steps of the method shown in FIG. 2A, according to embodiments of the present disclosure.

FIG. 5 is an exemplary flowchart illustrating additional steps of the method shown in FIG. 2A, according to embodiments of the present disclosure.

As shown in FIG. 5, the step S103, determining a power requirement for the plurality of beams, based at least on the coverage area comprises: S1031, determining an outside edge grid of the respective coverage area for the plurality of beams; and S1032, determining the power requirement, based on a mapping relationship between the outside edge grid and the power requirement.

According to embodiments of the present disclosure, an outside edge grid alone may be used to indicate the respective coverage area for the beam. That is, the information of both the minimums distance and the direction of the beam may be indicated by the outside edge grid. Further, it is efficient to determine the power requirement associated to outside edge grid, based on any kind of predetermined function expressions or lookup table including the mapping relationship between the outside edge grid and the power requirement, since this is basically a kind of direct mapping from one variable to another variable. Such function expressions or lookup table may be predetermined based on mathematic calculation or experiments.

Return to FIG. 2B, in the situation of utilizing the geographic grid, after the flow is start, the traffic fluxion of UEs in the concerned geographic grids will be specifically predicted by the traffic fluxion prediction model, the input parameters of the traffic fluxion prediction model may include (historically and/or currently) measured data about grids of at least one of: throughput, PRB utilization, number of RRC connections, etc. The future throughput, PRB utilization, number of RRC connections, etc. about grids will be output by the prediction model. Such 5G/B5G traffic fluxion of grids could be tracked by artificial intelligence/machine learning (AI/ML) methods or other traffic monitoring methods.

For example, the beam's coverage could be scaled according to traffic fluxion prediction result of girds. That is, when a geographic grid is predicted to have no UE to be served, a corresponding beam may be shrunk to not cover this geographic grid in a certain period, and vice versa.

In embodiments of the present disclosure, the power requirement is determined based at least on the outside edge grid, an amount of connected terminal devices, and positions of the connected terminal devices.

In some cases, due to the unavoidable deviation between the prediction result and the real situation, it is possible that the predicted power of the beam cannot serve all the current terminal devices, or the currently connected terminal devices (e.g. UEs) may be even far than the predicted outside edge grid. According to embodiments of the present disclosure, the power requirement is determined at least further considering the amount and positions of the currently connected terminal devices.

In embodiments of the present disclosure, the power requirement is determined to at least be able to cover both of the outside edge grid and the connected terminal devices.

That is, no matter how the beams are tuned in further, the service for the currently connected terminal device is continued.

In embodiments of the present disclosure, the network node is a macro base station in a heterogeneous network, HetNet; the plurality of the beams are generated by at least one of superposed base stations which are managed by the macro base station.

In embodiments of the present disclosure, the plurality of the beams are tuned for a beam recovery procedure.

According to embodiments, a macro base station is preferred to perform at least the prediction and calculation steps of the method since all the UEs within HetNet can be monitored by the macro base stations and related superposed base stations may be managed by the macro base station. However, it should be understood that the macro base station may also send collected information about UEs to other network nodes (such as core network node) with more powerful calculation capability, so as to balance the calculation load, or even the control or processing part of the macro base station may be distributed in the network by cloud or virtualization technology. Further, if the superposed base station (e.g. micro base station, pico base station, femto base station) have enough calculation capability, the method may be also performed by the superposed base station.

According to embodiments of the present disclosure, beam tuning (e.g. refactoring) will follow the user amount variation, that is, less power/beam coverage is for less users, more beam coverage is for more users. If more traffic is coming in the edge of a beam, the power could be increased for better RAN scheduling capacity based on network deployment. Thus, beam tuning is flexible and adaptive behavior, with smart & flexible capacity extension.

Further, part of beams may be deactivated or scaled based on machine learning prediction. The beam power may be saved to improve energy efficiency.

Further, the smart beam refactoring will benefit concerning interference management in the network as well, since part of beams may be scaled or turned off An embodiment with more details will be further illustrated below.

Firstly, a matrix beam_grid_load indicating the respective coverage requirement for a plurality of beams in the plurality of geographic grids is obtained from the results of prediction model.

$$\text{beam\_grid\_load} = \begin{bmatrix} x_{11} & x_{12} & x_{13} & \cdots & \cdots & x_{1n} \\ x_{21} & x_{22} & x_{23} & \cdots & \cdots & x_{2n} \\ x_{31} & x_{32} & x_{33} & \cdots & \cdots & x_{3n} \\ \vdots & \vdots & \vdots & \vdots & \vdots & \vdots \\ x_{m1} & x_{m2} & x_{m3} & \cdots & \cdots & x_{mn} \end{bmatrix};$$

m: Beam index; n: Geo grid index; $x_{mn}$: Grid traffic load level indicated by prediction. Invalid value indicates non-dependency between the beam and grid.

There may be following simplified example beams: Beam 1, covering Grid a, b, c, d, with the traffic load based on LSTM prediction: H, M, M, L; Beam 2, covering Grid a', b', c', d', with the traffic load based on LSTM prediction: H, L, L, Z.

Then, based on the above judgement input beam_grid_load matrix, the coverage edge related grids for each beam may be denoted as below.

Beam edge matrix:

$$E = [E_1 E_2 \ldots E_m];$$

E: cover all beams of the cell; m: beam index; $E_m$: the edge grid vector for beam m coverage [edge grid x, edge grid y, ... ].

E1 may be for beam 1, with edge grid of grid d. E2 may be for beam 2, with edge grid of grid c'. It should be understood there may be more than one edge grids for one beam.

Further, based on matrix E, TxP_Layout table is looked up to calculate final beam TX power, as action indicator. When there are many power results for one beam due to several edge grids of the beam, the maximum power element is to be selected.

$$\text{TxP\_Layout} = \begin{bmatrix} p_{11} & p_{12} & p_{13} & \cdots & \cdots & p_{1n} \\ p_{21} & p_{22} & p_{23} & \cdots & \cdots & p_{2n} \\ p_{31} & p_{32} & p_{33} & \cdots & \cdots & p_{3n} \\ \vdots & \vdots & \vdots & \vdots & \vdots & \vdots \\ p_{m1} & p_{m2} & p_{m3} & \cdots & \cdots & p_{mn} \end{bmatrix};$$

m: beam index; n: the edge grid index in vector $E_m$; $p_{mn}$: beam TX power layout. That is, the beam m may at least need a power $p_{mn}$ to cover the edge grid n.

This TxP_Layout matrix is pre-defined based on cell/beam deployment design. There may be different TxP_Layout corresponding to beam coverage demands.

Accordingly, the final beam TX power may be:
beam_power=$[P_1 P_2 \ldots P_m]$; as power decision for each beam m; $P_m$: Beam transmitted power required.

Beam 1's power decision $P_1$ is based on E1 (edge grid d) and the mapping Transmit power layout may be: pia. Beam 2's power decision $P_2$ is based on E2 (edge grid c') and the mapping Transmit power layout may be: plc'.

In embodiments of the present disclosure, beam power may be scaled in baseband processing, and the UEs online also impact the real edge grids. For example, for beam 2, some UEs online are in grid d', which is far than grid c'. Then, power decision for the beam 2 may be calibrated from plc' to pia'.

The beam power is the base for specific beam tuning actions, e.g. beam off, or power change.

Figure 6:
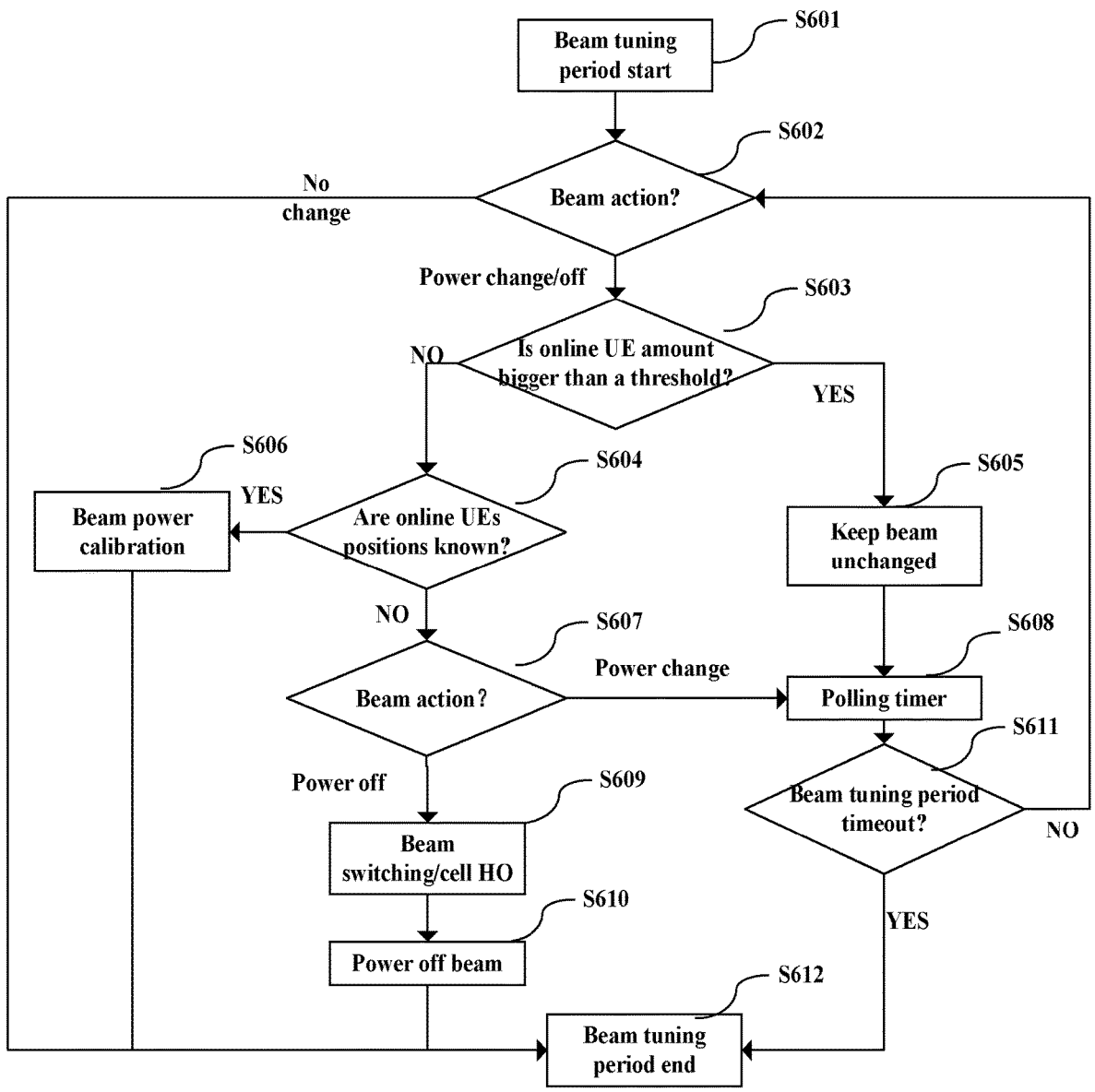
FIG. 6 is an exemplary flowchart showing beams tuning action flow, according to embodiments of the present disclosure.

FIG. 6 is an exemplary flowchart showing beams tuning action flow, according to embodiments of the present disclosure.

As shown in FIG. 6, in step S601, the beam tuning period starts.

In step S602, the beam action to be done may be determined based on the above predicted beam power. For example, it may be determined that the current beam power needs not to be changed, thus the flow goes to S612 directly, and the beam tuning period ends. Otherwise, it may be also determined that the current beam power needs to be changed (particularly reduced) or even to be turned off based on the predicted value, and then the flow goes to S603.

In step S603, it is further determined whether the online UEs' amount is bigger than a threshold or not. If yes, the flow goes to S605, to keep beam unchanged, so as to continue the current service for the currently connected UEs. If no, the flow goes to S604.

In step S604, it is determined whether the online UEs positions are known or not. If yes, the flow goes to S606, to calibrate the predicted beam power, so at to cover both the above outside edge grid and the current online/connected UEs. If no, the flow goes to S607 to make beam actions such as power change or power off.

If the beam is to be powered off, in S609, all connected UEs may be reconnected to other beam/cell, by switching or handover procedure. Then, in S610, the beam is powered off. Further, in S612, beam tuning period ends.

After the power is changed in S607, as the same as after the beam is kept unchanged in S605, the flow goes to S608, for polling timer.

In S611, if the beam tuning period is timeout, the flow goes to S612 to end the beam tuning period. If the beam tuning period is not timeout, the flow returns to S602 to start the next loop for beam action.

According to embodiments of the present disclosure, the embodiments of the present disclosure propose a new manner for beam tuning for RAN scaling, so as to improve energy efficiency and network capacity. The shape of each beam could be adaptively refactored accordingly. Particularly, the beam may be tuned based on predicted power requirement, and currently connected UEs, the power efficiency is improved while the service quality for the currently connected UEs may be maintained.

The UE moves among different zones, and for many coverage districts, the traffic load is regular, and predictable. The traffic load changed by UE fluxion could be leveraged for adaptive beam/cell coverage tuning, as the key concept of RAN Tuning. Therefore, considering the dynamic traffic load change is the trigger of beam refactoring, one idea is to introduce machine intelligence based on LSTM, for traffic load prediction.

The fluxion tracking is based on all the cell traffic data variation in the RAN within a geographic district, in order to show the real traffic fluxion in the area. While the candidate beams to be refactored will be decided based on the district traffic fluxion prediction.

All the UEs within a HetNet district could be monitored by Marco cell or superposed cells, so the data information is fully collected for the prediction. The embodiments of the present disclosure may focus on traffic data, rather than IDLE UE, since IDLE is not key for traffic prediction, and it is impossible for network to collect IDLE UE data. Further, inter cell coordination is a manner to assist bigger RAN tuning uniformly within the network.

The embodiments of the present disclosure propose a new method for beam tuning/refactoring, which is an intelligent beam refactoring manner, and the beam of each cell could be powered on/off, furthermore, the shape of each beam could be adaptively changed as well according to the tidal effect of user traffic.

It should be understood that, the HetNet deployment may be one exemplary scenario for the intelligent beam refactoring according to embodiments of the present disclosure, but the embodiments of the present disclosure are not limited to Hetnet. For example, the macro base station in the macro cell may just tune the beams from itself, when there is no superposed base station in the superposed cell.

Figure 7:
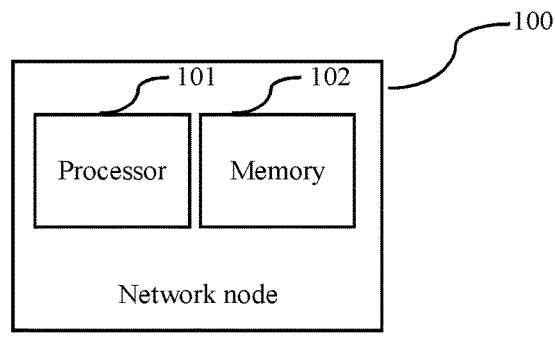
FIG. 7 is a block diagram showing exemplary apparatuses suitable for practicing the network node according to embodiments of the disclosure.

FIG. 7 is a block diagram showing exemplary apparatuses suitable for practicing the network node according to embodiments of the disclosure.

As shown in FIG. 7, the network node 100 may comprise: a processor 101; and a memory 102. The memory 102 contains instructions executable by the processor 101, whereby the network node 100 is operative to: determine a respective coverage requirement for a plurality of beams; determine a respective coverage area for the plurality of beams, based on the determined coverage requirement; determine a power requirement for the plurality of beams, based at least on the determined coverage area; and tune at least one the plurality of the beams, based at least on the determined power requirement.

In embodiments of the present disclosure, the network node 100 is operative to perform the method according to any of the above embodiments, such as these shown in FIG. 2A-6.

The processors 101 may be any kind of processing component, such as one or more microprocessor or microcontrollers, as well as other digital hardware, which may include digital signal processors (DSPs), special-purpose digital logic, and the like. The memories 102 may be any kind of storage component, such as read-only memory (ROM), random-access memory, cache memory, flash memory devices, optical storage devices, etc.

Figure 8:
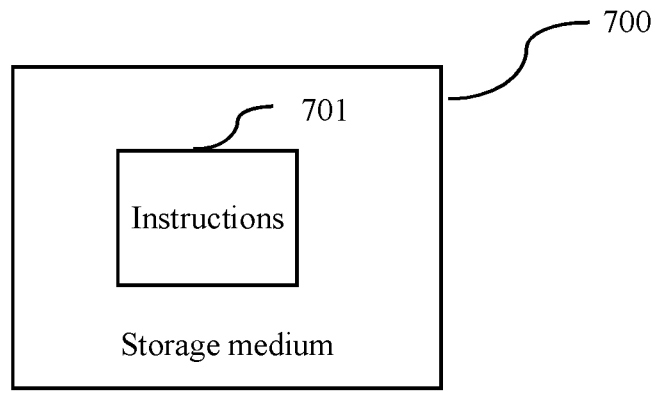
FIG. 8 is a block diagram showing an apparatus/computer readable storage medium, according to embodiments of the present disclosure.

FIG. 8 is a block diagram showing an apparatus/computer readable storage medium, according to embodiments of the present disclosure.

As shown in FIG. 8, the computer-readable storage medium 700, or any other kind of product, storing instructions 701 which when executed by at least one processor, cause the at least one processor to perform the method according to any one of the above embodiments, such as these shown in FIG. 2A-6.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

Figure 9:
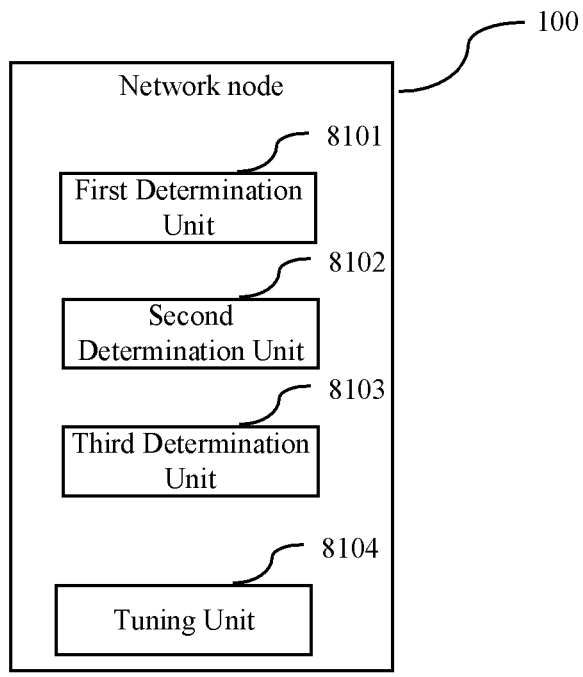
FIG. 9 is a schematic showing units for the network node, according to embodiments of the present disclosure.

FIG. 9 is a schematic showing units for the network node, according to embodiments of the present disclosure.

As shown in FIG. 9, the network node 100 may comprise: a first determination unit 8101, configured to determine a respective coverage requirement for a plurality of beams; a second determination unit 8102, configured to determine a respective coverage area for the plurality of beams, based on the determined coverage requirement; a third determination unit 8103, configured to determine a power requirement for the plurality of beams, based at least on the determined coverage area; and a tuning unit 8104, configured to tune at least one the plurality of the beams, based at least on the determined power requirement.

In embodiments of the present disclosure, the network node 100 is operative to perform the method according to any of the above embodiments, such as these shown in FIG. 2A-6.

The term 'unit' may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

With these units, the network node 100 may not need a fixed processor or memory, any computing resource and storage resource may be arranged from at least one network node/device/entity/apparatus relating to the communication system. The virtualization technology and network computing technology (e.g. cloud computing) may be further introduced, so as to improve the usage efficiency of the network resources and the flexibility of the network.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Particularly, these function units may be implemented either as a network element on a dedicated hardware, as a software instance running on a dedicated hardware, or as a virtualized function instantiated on an appropriate platform, e.g. on a cloud infrastructure.

Figure 10:
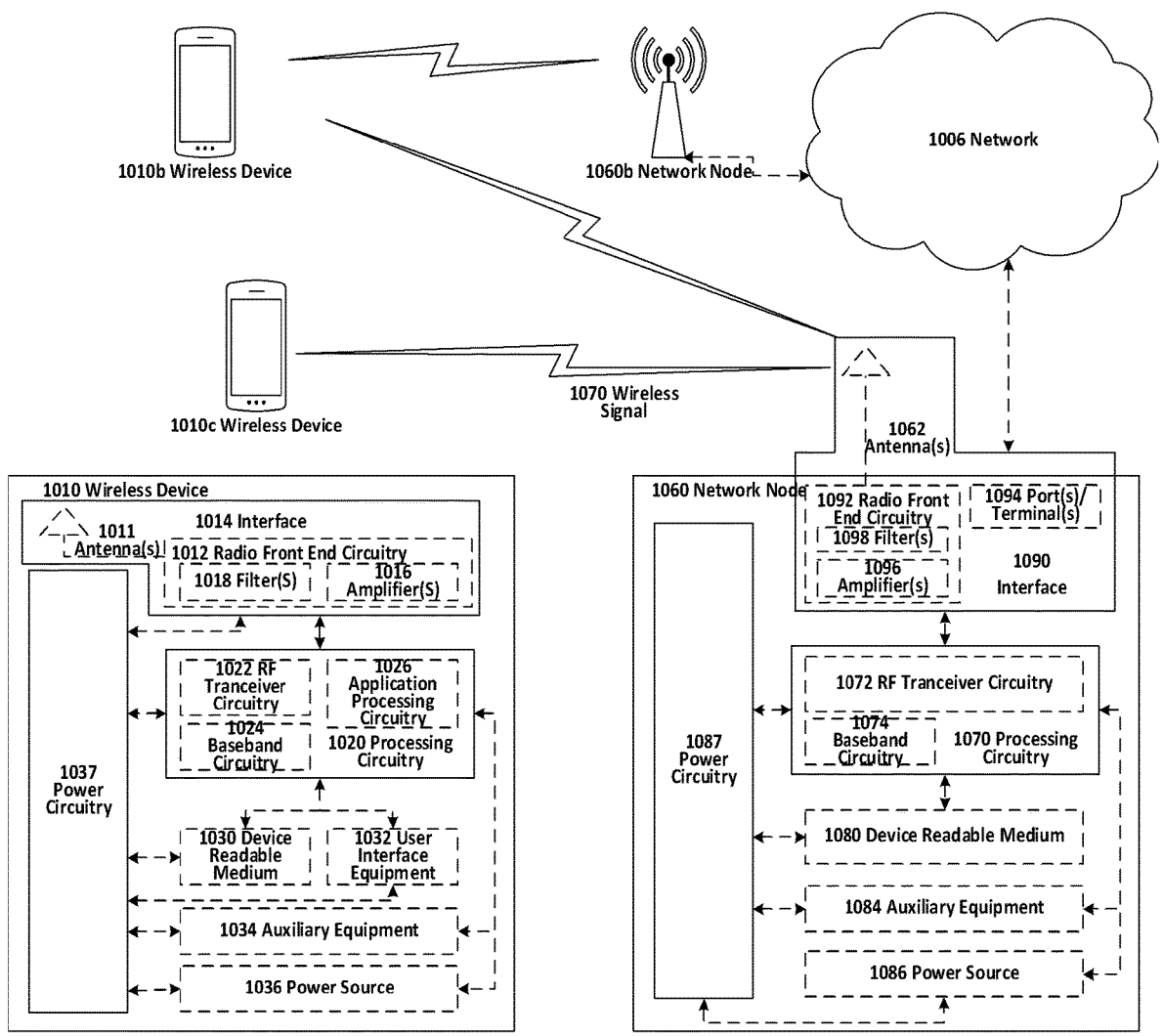
FIG. 10 is a schematic showing a wireless network in accordance with some embodiments.

FIG. 10 is a schematic showing a wireless network in accordance with some embodiments.

Although the subject matter described herein may be implemented in any appropriate type of system using any suitable components, the embodiments disclosed herein are described in relation to a wireless network, such as the example wireless network illustrated in FIG. 10. For simplicity, the wireless network of FIG. 10 only depicts network 1006, network nodes 1060 (corresponding to network node 100) and 1060b, and WDs 1010, 1010b, and 1010c. In practice, a wireless network may further include any additional elements suitable to support communication between wireless devices or between a wireless device and another communication device, such as a landline telephone, a service provider, or any other network node or end device. Of the illustrated components, network node 1060 and wireless device (WD) 1010 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1006 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1060 and WD 1010 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 10, network node 1060 includes processing circuitry 1070, device readable medium 1080, interface 1090, auxiliary equipment 1084, power source 1086, power circuitry 1087, and antenna 1062. Although network node 1060 illustrated in the example wireless network of FIG. 10 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1060 are depicted as single boxes located within a larger box, or nested within multiple boxes, in practice, a network node may comprise multiple different physical components that make up a single illustrated component (e.g., device readable medium 1080 may comprise multiple separate hard drives as well as multiple RAM modules).

Similarly, network node 1060 may be composed of multiple physically separate components (e.g., a NodeB component and a RNC component, or a BTS component and a BSC component, etc.), which may each have their own respective components. In certain scenarios in which network node 1060 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1060 may be configured to support multiple radio access technologies (RATs). In such embodiments, some components may be duplicated (e.g., separate device readable medium 1080 for the different RATs) and some components may be reused (e.g., the same antenna 1062 may be shared by the RATs). Network node 1060 may also include multiple sets of the various illustrated components for different wireless technologies integrated into network node 1060, such as, for example, GSM, WCDMA, LTE, NR, WiFi, or Bluetooth wireless technologies. These wireless technologies may be integrated into the same or different chip or set of chips and other components within network node 1060.

Processing circuitry 1070 is configured to perform any determining, calculating, or similar operations (e.g., certain obtaining operations) described herein as being provided by a network node. These operations performed by processing circuitry 1070 may include processing information obtained by processing circuitry 1070 by, for example, converting the obtained information into other information, comparing the obtained information or converted information to information stored in the network node, and/or performing one or more operations based on the obtained information or converted information, and as a result of said processing making a determination.

Processing circuitry 1070 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1060 components, such as device readable medium 1080, network node 1060 functionality. For example, processing circuitry 1070 may execute instructions stored in device readable medium 1080 or in memory within processing circuitry 1070. Such functionality may include providing any of the various wireless features, functions, or benefits discussed herein. In some embodiments, processing circuitry 1070 may include a system on a chip (SOC).

In some embodiments, processing circuitry 1070 may include one or more of radio frequency (RF) transceiver circuitry 1072 and baseband processing circuitry 1074. In some embodiments, radio frequency (RF) transceiver circuitry 1072 and baseband processing circuitry 1074 may be on separate chips (or sets of chips), boards, or units, such as radio units and digital units. In alternative embodiments, part or all of RF transceiver circuitry 1072 and baseband processing circuitry 1074 may be on the same chip or set of chips, boards, or units In certain embodiments, some or all of the functionality described herein as being provided by a network node, base station, eNB or other such network device may be performed by processing circuitry 1070 executing instructions stored on device readable medium 1080 or memory within processing circuitry 1070. In alternative embodiments, some or all of the functionality may be provided by processing circuitry 1070 without executing instructions stored on a separate or discrete device readable medium, such as in a hard-wired manner. In any of those embodiments, whether executing instructions stored on a device readable storage medium or not, processing circuitry 1070 can be configured to perform the described functionality. The benefits provided by such functionality are not limited to processing circuitry 1070 alone or to other components of network node 1060, but are enjoyed by network node 1060 as a whole, and/or by end users and the wireless network generally.

Device readable medium 1080 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1070. Device readable medium 1080 may store any suitable instructions, data or information, including a computer program, software, an application including one or more of logic, rules, code, tables, etc. and/or other instructions capable of being executed by processing circuitry 1070 and, utilized by network node 1060. Device readable medium 1080 may be used to store any calculations made by processing circuitry 1070 and/or any data received via interface 1090. In some embodiments, processing circuitry 1070 and device readable medium 1080 may be considered to be integrated.

Interface 1090 is used in the wired or wireless communication of signalling and/or data between network node 1060, network 1006, and/or WDs 1010. As illustrated, interface 1090 comprises port(s)/terminal(s) 1094 to send and receive data, for example to and from network 1006 over a wired connection. Interface 1090 also includes radio front end circuitry 1092 that may be coupled to, or in certain embodiments a part of, antenna 1062. Radio front end circuitry 1092 comprises filters 1098 and amplifiers 1096. Radio front end circuitry 1092 may be connected to antenna 1062 and processing circuitry 1070. Radio front end circuitry may be configured to condition signals communicated between antenna 1062 and processing circuitry 1070. Radio front end circuitry 1092 may receive digital data that is to be sent out to other network nodes or WDs via a wireless connection. Radio front end circuitry 1092 may convert the digital data into a radio signal having the appropriate channel and bandwidth parameters using a combination of filters 1098 and/or amplifiers 1096. The radio signal may then be transmitted via antenna 1062. Similarly, when receiving data, antenna 1062 may collect radio signals which are then converted into digital data by radio front end circuitry 1092. The digital data may be passed to processing circuitry 1070. In other embodiments, the interface may comprise different components and/or different combinations of components.

In certain alternative embodiments, network node 1060 may not include separate radio front end circuitry 1092, instead, processing circuitry 1070 may comprise radio front end circuitry and may be connected to antenna 1062 without separate radio front end circuitry 1092. Similarly, in some embodiments, all or some of RF transceiver circuitry 1072 may be considered a part of interface 1090. In still other embodiments, interface 1090 may include one or more ports or terminals 1094, radio front end circuitry 1092, and RF transceiver circuitry 1072, as part of a radio unit (not shown), and interface 1090 may communicate with baseband processing circuitry 1074, which is part of a digital unit (not shown).

Antenna 1062 may include one or more antennas, or antenna arrays, configured to send and/or receive wireless signals. Antenna 1062 may be coupled to radio front end circuitry 1090 and may be any type of antenna capable of transmitting and receiving data and/or signals wirelessly. In some embodiments, antenna 1062 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1062 may be separate from network node 1060 and may be connectable to network node 1060 through an interface or port.

Antenna 1062, interface 1090, and/or processing circuitry 1070 may be configured to perform any receiving operations and/or certain obtaining operations described herein as being performed by a network node. Any information, data and/or signals may be received from a wireless device, another network node and/or any other network equipment. Similarly, antenna 1062, interface 1090, and/or processing circuitry 1070 may be configured to perform any transmitting operations described herein as being performed by a network node. Any information, data and/or signals may be transmitted to a wireless device, another network node and/or any other network equipment.

Power circuitry 1087 may comprise, or be coupled to, power management circuitry and is configured to supply the components of network node 1060 with power for performing the functionality described herein. Power circuitry 1087 may receive power from power source 1086. Power source 1086 and/or power circuitry 1087 may be configured to provide power to the various components of network node 1060 in a form suitable for the respective components (e.g., at a voltage and current level needed for each respective component). Power source 1086 may either be included in, or external to, power circuitry 1087 and/or network node 1060. For example, network node 1060 may be connectable to an external power source (e.g., an electricity outlet) via an input circuitry or interface such as an electrical cable, whereby the external power source supplies power to power circuitry 1087. As a further example, power source 1086 may comprise a source of power in the form of a battery or battery pack which is connected to, or integrated in, power circuitry 1087. The battery may provide backup power should the external power source fail. Other types of power sources, such as photovoltaic devices, may also be used.

Alternative embodiments of network node 1060 may include additional components beyond those shown in FIG. 10 that may be responsible for providing certain aspects of the network node's functionality, including any of the functionality described herein and/or any functionality necessary to support the subject matter described herein. For example, network node 1060 may include user interface equipment to allow input of information into network node 1060 and to allow output of information from network node 1060. This may allow a user to perform diagnostic, maintenance, repair, and other administrative functions for network node 1060.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1010 includes antenna 1011, interface 1014, processing circuitry 1020, device readable medium 1030, user interface equipment 1032, auxiliary equipment 1034, power source 1036 and power circuitry 1037. WD 1010 may include multiple sets of one or more of the illustrated components for different wireless technologies supported by WD 1010, such as, for example, GSM, WCDMA, LTE, NR, WiFi, WiMAX, or Bluetooth wireless technologies, just to mention a few. These wireless technologies may be integrated into the same or different chips or set of chips as other components within WD 1010.

Antenna 1011 may include one or more antennas or antenna arrays, configured to send and/or receive wireless signals, and is connected to interface 1014. In certain alternative embodiments, antenna 1011 may be separate from WD 1010 and be connectable to WD 1010 through an interface or port. Antenna 1011, interface 1014, and/or processing circuitry 1020 may be configured to perform any receiving or transmitting operations described herein as being performed by a WD. Any information, data and/or signals may be received from a network node and/or another WD. In some embodiments, radio front end circuitry and/or antenna 1011 may be considered an interface.

As illustrated, interface 1014 comprises radio front end circuitry 1012 and antenna 1011. Radio front end circuitry 1012 comprise one or more filters 1018 and amplifiers 1016. Radio front end circuitry 1014 is connected to antenna 1011 and processing circuitry 1020, and is configured to condition signals communicated between antenna 1011 and processing circuitry 1020. Radio front end circuitry 1012 may be coupled to or a part of antenna 1011. In some embodiments, WD 1010 may not include separate radio front end circuitry 1012; rather, processing circuitry 1020 may comprise radio front end circuitry and may be connected to antenna 1011. Similarly, in some embodiments, some or all of RF transceiver circuitry 1022 may be considered a part of interface 1014. Radio front end circuitry 1012 may receive digital data that is to be sent out to other network nodes or WDs via a wireless connection. Radio front end circuitry 1012 may convert the digital data into a radio signal having the appropriate channel and bandwidth parameters using a combination of filters 1018 and/or amplifiers 1016. The radio signal may then be transmitted via antenna 1011. Similarly, when receiving data, antenna 1011 may collect radio signals which are then converted into digital data by radio front end circuitry 1012. The digital data may be passed to processing circuitry 1020. In other embodiments, the interface may comprise different components and/or different combinations of components.

Processing circuitry 1020 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1010 components, such as device readable medium 1030, WD 1010 functionality. Such functionality may include providing any of the various wireless features or benefits discussed herein. For example, processing circuitry 1020 may execute instructions stored in device readable medium 1030 or in memory within processing circuitry 1020 to provide the functionality disclosed herein.

As illustrated, processing circuitry 1020 includes one or more of RF transceiver circuitry 1022, baseband processing circuitry 1024, and application processing circuitry 1026. In other embodiments, the processing circuitry may comprise different components and/or different combinations of components. In certain embodiments processing circuitry 1020 of WD 1010 may comprise a SOC. In some embodiments, RF transceiver circuitry 1022, baseband processing circuitry 1024, and application processing circuitry 1026 may be on separate chips or sets of chips. In alternative embodiments, part or all of baseband processing circuitry 1024 and application processing circuitry 1026 may be combined into one chip or set of chips, and RF transceiver circuitry 1022 may be on a separate chip or set of chips. In still alternative embodiments, part or all of RF transceiver circuitry 1022 and baseband processing circuitry 1024 may be on the same chip or set of chips, and application processing circuitry 1026 may be on a separate chip or set of chips. In yet other alternative embodiments, part or all of RF transceiver circuitry 1022, baseband processing circuitry 1024, and application processing circuitry 1026 may be combined in the same chip or set of chips. In some embodiments, RF transceiver circuitry 1022 may be a part of interface 1014. RF transceiver circuitry 1022 may condition RF signals for processing circuitry 1020.

In certain embodiments, some or all of the functionality described herein as being performed by a WD may be provided by processing circuitry 1020 executing instructions stored on device readable medium 1030, which in certain embodiments may be a computer-readable storage medium. In alternative embodiments, some or all of the functionality may be provided by processing circuitry 1020 without executing instructions stored on a separate or discrete device readable storage medium, such as in a hard-wired manner. In any of those particular embodiments, whether executing instructions stored on a device readable storage medium or not, processing circuitry 1020 can be configured to perform the described functionality. The benefits provided by such functionality are not limited to processing circuitry 1020 alone or to other components of WD 1010, but are enjoyed by WD 1010 as a whole, and/or by end users and the wireless network generally.

Processing circuitry 1020 may be configured to perform any determining, calculating, or similar operations (e.g., certain obtaining operations) described herein as being performed by a WD. These operations, as performed by processing circuitry 1020, may include processing information obtained by processing circuitry 1020 by, for example, converting the obtained information into other information, comparing the obtained information or converted information to information stored by WD 1010, and/or performing one or more operations based on the obtained information or converted information, and as a result of said processing making a determination.

Device readable medium 1030 may be operable to store a computer program, software, an application including one or more of logic, rules, code, tables, etc. and/or other instructions capable of being executed by processing circuitry 1020. Device readable medium 1030 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1020. In some embodiments, processing circuitry 1020 and device readable medium 1030 may be considered to be integrated.

User interface equipment 1032 may provide components that allow for a human user to interact with WD 1010. Such interaction may be of many forms, such as visual, audial, tactile, etc. User interface equipment 1032 may be operable to produce output to the user and to allow the user to provide input to WD 1010. The type of interaction may vary depending on the type of user interface equipment 1032 installed in WD 1010. For example, if WD 1010 is a smart phone, the interaction may be via a touch screen; if WD 1010 is a smart meter, the interaction may be through a screen that provides usage (e.g., the number of gallons used) or a speaker that provides an audible alert (e.g., if smoke is detected). User interface equipment 1032 may include input interfaces, devices and circuits, and output interfaces, devices and circuits. User interface equipment 1032 is configured to allow input of information into WD 1010, and is connected to processing circuitry 1020 to allow processing circuitry 1020 to process the input information. User interface equipment 1032 may include, for example, a microphone, a proximity or other sensor, keys/buttons, a touch display, one or more cameras, a USB port, or other input circuitry. User interface equipment 1032 is also configured to allow output of information from WD 1010, and to allow processing circuitry 1020 to output information from WD 1010. User interface equipment 1032 may include, for example, a speaker, a display, vibrating circuitry, a USB port, a headphone interface, or other output circuitry. Using one or more input and output interfaces, devices, and circuits, of user interface equipment 1032, WD 1010 may communicate with end users and/or the wireless network, and allow them to benefit from the functionality described herein.

Auxiliary equipment 1034 is operable to provide more specific functionality which may not be generally performed by WDs. This may comprise specialized sensors for doing measurements for various purposes, interfaces for additional types of communication such as wired communications etc. The inclusion and type of components of auxiliary equipment 1034 may vary depending on the embodiment and/or scenario.

Power source 1036 may, in some embodiments, be in the form of a battery or battery pack. Other types of power sources, such as an external power source (e.g., an electricity outlet), photovoltaic devices or power cells, may also be used. WD 1010 may further comprise power circuitry 1037 for delivering power from power source 1036 to the various parts of WD 1010 which need power from power source 1036 to carry out any functionality described or indicated herein. Power circuitry 1037 may in certain embodiments comprise power management circuitry. Power circuitry 1037 may additionally or alternatively be operable to receive power from an external power source; in which case WD 1010 may be connectable to the external power source (such as an electricity outlet) via input circuitry or an interface such as an electrical power cable. Power circuitry 1037 may also in certain embodiments be operable to deliver power from an external power source to power source 1036. This may be, for example, for the charging of power source 1036. Power circuitry 1037 may perform any formatting, converting, or other modification to the power from power source 1036 to make the power suitable for the respective components of WD 1010 to which power is supplied.

Figure 11:
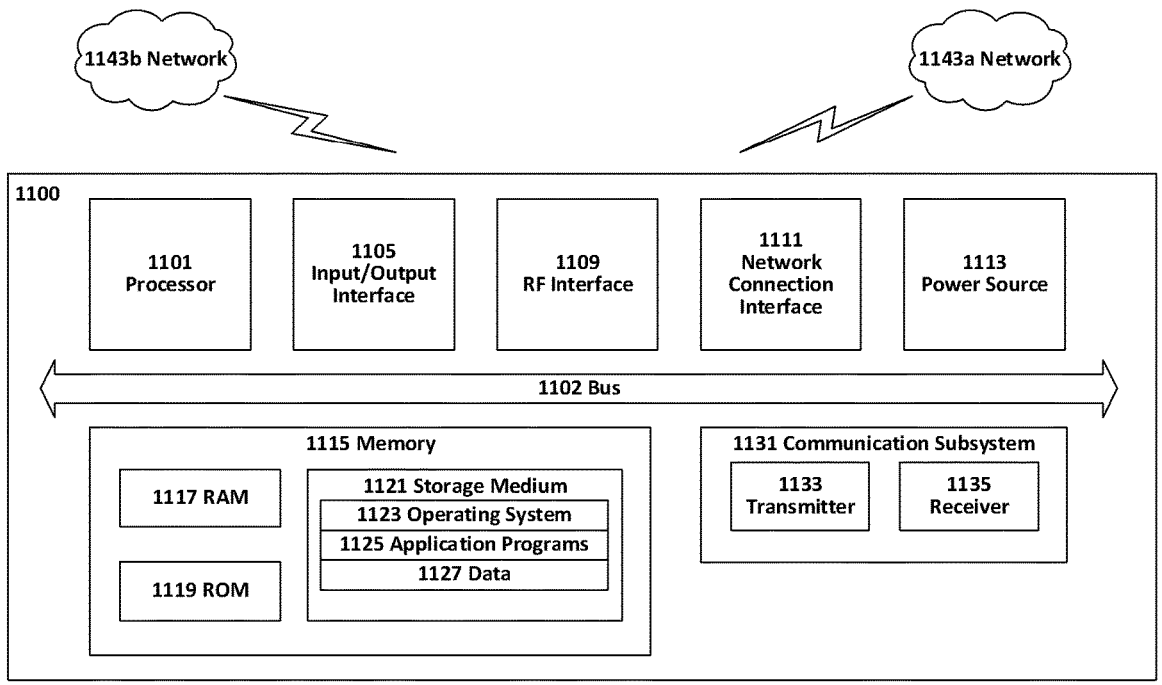
FIG. 11 is a schematic showing a user equipment in accordance with some embodiments.

FIG. 11 is a schematic showing a user equipment in accordance with some embodiments.

FIG. 11 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 1100 may be any UE identified by the 3' Generation Partnership Project (3GPP), including a NB-IoT UE, a machine type communication (MTC) UE, and/or an enhanced MTC (eMTC) UE. UE 1100, as illustrated in FIG. 11, is one example of a WD configured for communication in accordance with one or more communication standards promulgated by the 3" Generation Partnership Project (3GPP), such as 3GPP's GSM, UMTS, LTE, and/or 5G standards. As mentioned previously, the term WD and UE may be used interchangeable. Accordingly, although FIG. 11 is a UE, the components discussed herein are equally applicable to a WD, and vice-versa.

In FIG. 11, UE 1100 includes processing circuitry 1101 that is operatively coupled to input/output interface 1105, radio frequency (RF) interface 1109, network connection interface 1111, memory 1115 including random access memory (RAM) 1117, read-only memory (ROM) 1119, and storage medium 1121 or the like, communication subsystem 1131, power source 1133, and/or any other component, or any combination thereof. Storage medium 1121 includes operating system 1123, application program 1125, and data 1127. In other embodiments, storage medium 1121 may include other similar types of information. Certain UEs may utilize all of the components shown in FIG. 11, or only a subset of the components. The level of integration between the components may vary from one UE to another UE. Further, certain UEs may contain multiple instances of a component, such as multiple processors, memories, transceivers, transmitters, receivers, etc.

In FIG. 11, processing circuitry 1101 may be configured to process computer instructions and data. Processing circuitry 1101 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1101 may include two central processing units (CPUs). Data may be information in a form suitable for use by a computer.

In the depicted embodiment, input/output interface 1105 may be configured to provide a communication interface to an input device, output device, or input and output device. UE 1100 may be configured to use an output device via input/output interface 1105. An output device may use the same type of interface port as an input device. For example, a USB port may be used to provide input to and output from UE 1100. The output device may be a speaker, a sound card, a video card, a display, a monitor, a printer, an actuator, an emitter, a smartcard, another output device, or any combination thereof. UE 1100 may be configured to use an input device via input/output interface 1105 to allow a user to capture information into UE 1100. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 11, RF interface 1109 may be configured to provide a communication interface to RF components such as a transmitter, a receiver, and an antenna. Network connection interface 1111 may be configured to provide a communication interface to network 1143a. Network 1143a may encompass wired and/or wireless networks such as a local-area network (LAN), a wide-area network (WAN), a computer network, a wireless network, a telecommunications network, another like network or any combination thereof. For example, network 1143*a* may comprise a Wi-Fi network. Network connection interface 1111 may be configured to include a receiver and a transmitter interface used to communicate with one or more other devices over a communication network according to one or more communication protocols, such as Ethernet, TCP/IP, SONET, ATM, or the like. Network connection interface 1111 may implement receiver and transmitter functionality appropriate to the communication network links (e.g., optical, electrical, and the like). The transmitter and receiver functions may share circuit components, software or firmware, or alternatively may be implemented separately.

RAM 1117 may be configured to interface via bus 1102 to processing circuitry 1101 to provide storage or caching of data or computer instructions during the execution of software programs such as the operating system, application programs, and device drivers. ROM 1119 may be configured to provide computer instructions or data to processing circuitry 1101. For example, ROM 1119 may be configured to store invariant low-level system code or data for basic system functions such as basic input and output (I/O), startup, or reception of keystrokes from a keyboard that are stored in a non-volatile memory. Storage medium 1121 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1121 may be configured to include operating system 1123, application program 1125 such as a web browser application, a widget or gadget engine or another application, and data file 1127. Storage medium 1121 may store, for use by UE 1100, any of a variety of various operating systems or combinations of operating systems.

Storage medium 1121 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1121 may allow UE 1100 to access computer-executable instructions, application programs or the like, stored on transitory or non-transitory memory media, to off-load data, or to upload data. An article of manufacture, such as one utilizing a communication system may be tangibly embodied in storage medium 1121, which may comprise a device readable medium.

In FIG. 11, processing circuitry 1101 may be configured to communicate with network 1143*b* using communication subsystem 1131. Network 1143*a* and network 1143*b* may be the same network or networks or different network or networks. Communication subsystem 1131 may be configured to include one or more transceivers used to communicate with network 1143*b*. For example, communication subsystem 1131 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 1133 and/or receiver 1135 to implement transmitter or receiver functionality, respectively, appropriate to the RAN links (e.g., frequency allocations and the like). Further, transmitter 1133 and receiver 1135 of each transceiver may share circuit components, software or firmware, or alternatively may be implemented separately.

In the illustrated embodiment, the communication functions of communication subsystem 1131 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1131 may include cellular communication, Wi-Fi communication, Bluetooth communication, and GPS communication. Network 1143*b* may encompass wired and/or wireless networks such as a local-area network (LAN), a wide-area network (WAN), a computer network, a wireless network, a telecommunications network, another like network or any combination thereof. For example, network 1143*b* may be a cellular network, a Wi-Fi network, and/or a near-field network. Power source 1113 may be configured to provide alternating current (AC) or direct current (DC) power to components of UE 1100.

The features, benefits and/or functions described herein may be implemented in one of the components of UE 1100 or partitioned across multiple components of UE 1100. Further, the features, benefits, and/or functions described herein may be implemented in any combination of hardware, software or firmware. In one example, communication subsystem 1131 may be configured to include any of the components described herein. Further, processing circuitry 1101 may be configured to communicate with any of such components over bus 1102. In another example, any of such components may be represented by program instructions stored in memory that when executed by processing circuitry 1101 perform the corresponding functions described herein. In another example, the functionality of any of such components may be partitioned between processing circuitry 1101 and communication subsystem 1131. In another example, the non-computationally intensive functions of any of such components may be implemented in software or firmware and the computationally intensive functions may be implemented in hardware.

Figure 12:
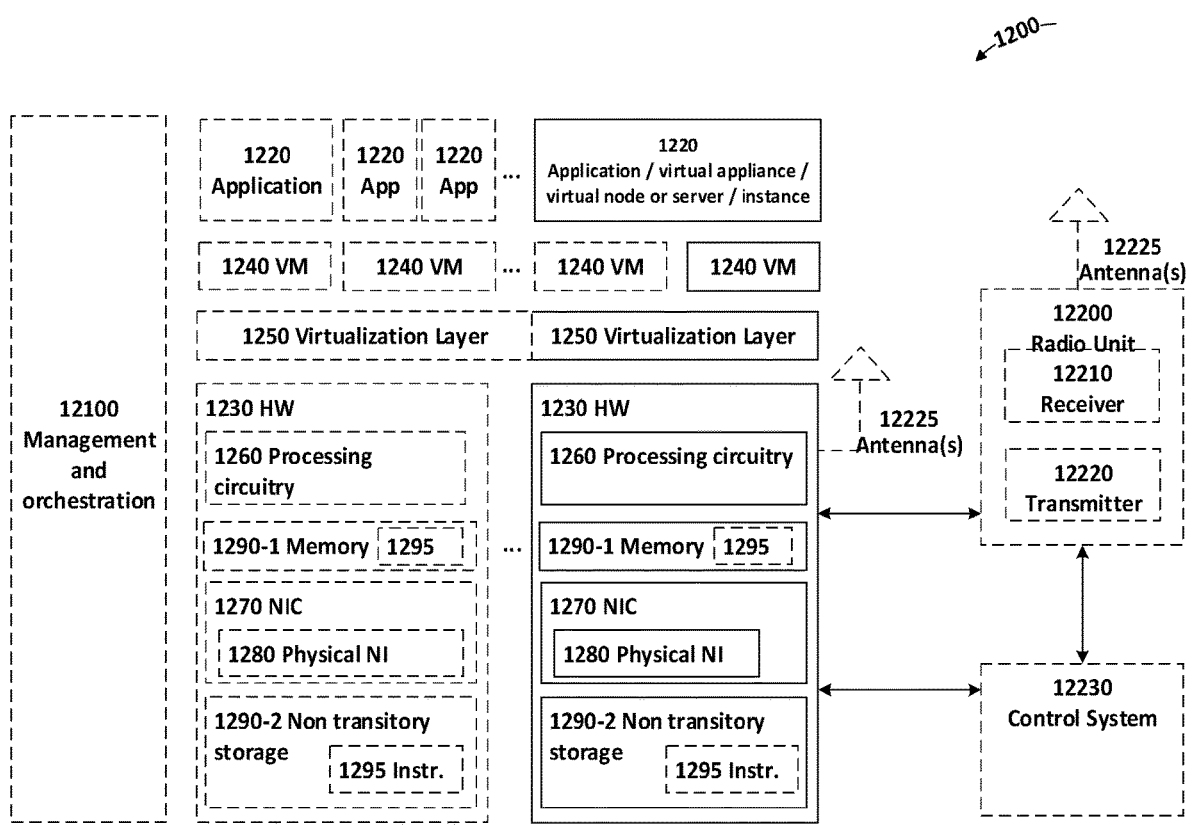
FIG. 12 is a schematic showing a virtualization environment in accordance with some embodiments.

FIG. 12 is a schematic showing a virtualization environment in accordance with some embodiments.

FIG. 12 is a schematic block diagram illustrating a virtualization environment 1200 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1200 hosted by one or more of hardware nodes 1230. Further, in embodiments in which the virtual node is not a radio access node or does not require radio connectivity (e.g., a core network node), then the network node may be entirely virtualized.

The functions may be implemented by one or more applications 1220 (which may alternatively be called software instances, virtual appliances, network functions, virtual nodes, virtual network functions, etc.) operative to implement some of the features, functions, and/or benefits of some of the embodiments disclosed herein. Applications 1220 are run in virtualization environment 1200 which provides hardware 1230 comprising processing circuitry 1260 and memory 1290. Memory 1290 contains instructions 1295 executable by processing circuitry 1260 whereby application 1220 is operative to provide one or more of the features, benefits, and/or functions disclosed herein.

Virtualization environment 1200, comprises general-purpose or special-purpose network hardware devices 1230 comprising a set of one or more processors or processing circuitry 1260, which may be commercial off-the-shelf (COTS) processors, dedicated Application Specific Integrated Circuits (ASICs), or any other type of processing circuitry including digital or analog hardware components or special purpose processors. Each hardware device may comprise memory 1290-1 which may be non-persistent memory for temporarily storing instructions 1295 or software executed by processing circuitry 1260. Each hardware device may comprise one or more network interface controllers (NICs) 1270, also known as network interface cards, which include physical network interface 1280. Each hardware device may also include non-transitory, persistent, machine-readable storage media 1290-2 having stored therein software 1295 and/or instructions executable by processing circuitry 1260. Software 1295 may include any type of software including software for instantiating one or more virtualization layers 1250 (also referred to as hypervisors), software to execute virtual machines 1240 as well as software allowing it to execute functions, features and/or benefits described in relation with some embodiments described herein.

Virtual machines 1240, comprise virtual processing, virtual memory, virtual networking or interface and virtual storage, and may be run by a corresponding virtualization layer 1250 or hypervisor. Different embodiments of the instance of virtual appliance 1220 may be implemented on one or more of virtual machines 1240, and the implementations may be made in different ways.

During operation, processing circuitry 1260 executes software 1295 to instantiate the hypervisor or virtualization layer 1250, which may sometimes be referred to as a virtual machine monitor (VMM). Virtualization layer 1250 may present a virtual operating platform that appears like networking hardware to virtual machine 1240.

As shown in FIG. 12, hardware 1230 may be a standalone network node with generic or specific components. Hardware 1230 may comprise antenna 12225 and may implement some functions via virtualization. Alternatively, hardware 1230 may be part of a larger cluster of hardware (e.g. such as in a data center or customer premise equipment (CPE)) where many hardware nodes work together and are managed via management and orchestration (MANO) 12100, which, among others, oversees lifecycle management of applications 1220.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1240 may be a software implementation of a physical machine that runs programs as if they were executing on a physical, non-virtualized machine. Each of virtual machines 1240, and that part of hardware 1230 that executes that virtual machine, be it hardware dedicated to that virtual machine and/or hardware shared by that virtual machine with others of the virtual machines 1240, forms a separate virtual network elements (VNE).

Still in the context of NFV, Virtual Network Function (VNF) is responsible for handling specific network functions that run in one or more virtual machines 1240 on top of hardware networking infrastructure 1230 and corresponds to application 1220 in FIG. 12.

In some embodiments, one or more radio units 12200 that each include one or more transmitters 12220 and one or more receivers 12210 may be coupled to one or more antennas 12225. Radio units 12200 may communicate directly with hardware nodes 1230 via one or more appropriate network interfaces and may be used in combination with the virtual components to provide a virtual node with radio capabilities, such as a radio access node or a base station.

In some embodiments, some signalling can be effected with the use of control system 12230 which may alternatively be used for communication between the hardware nodes 1230 and radio units 12200.

Figure 13:
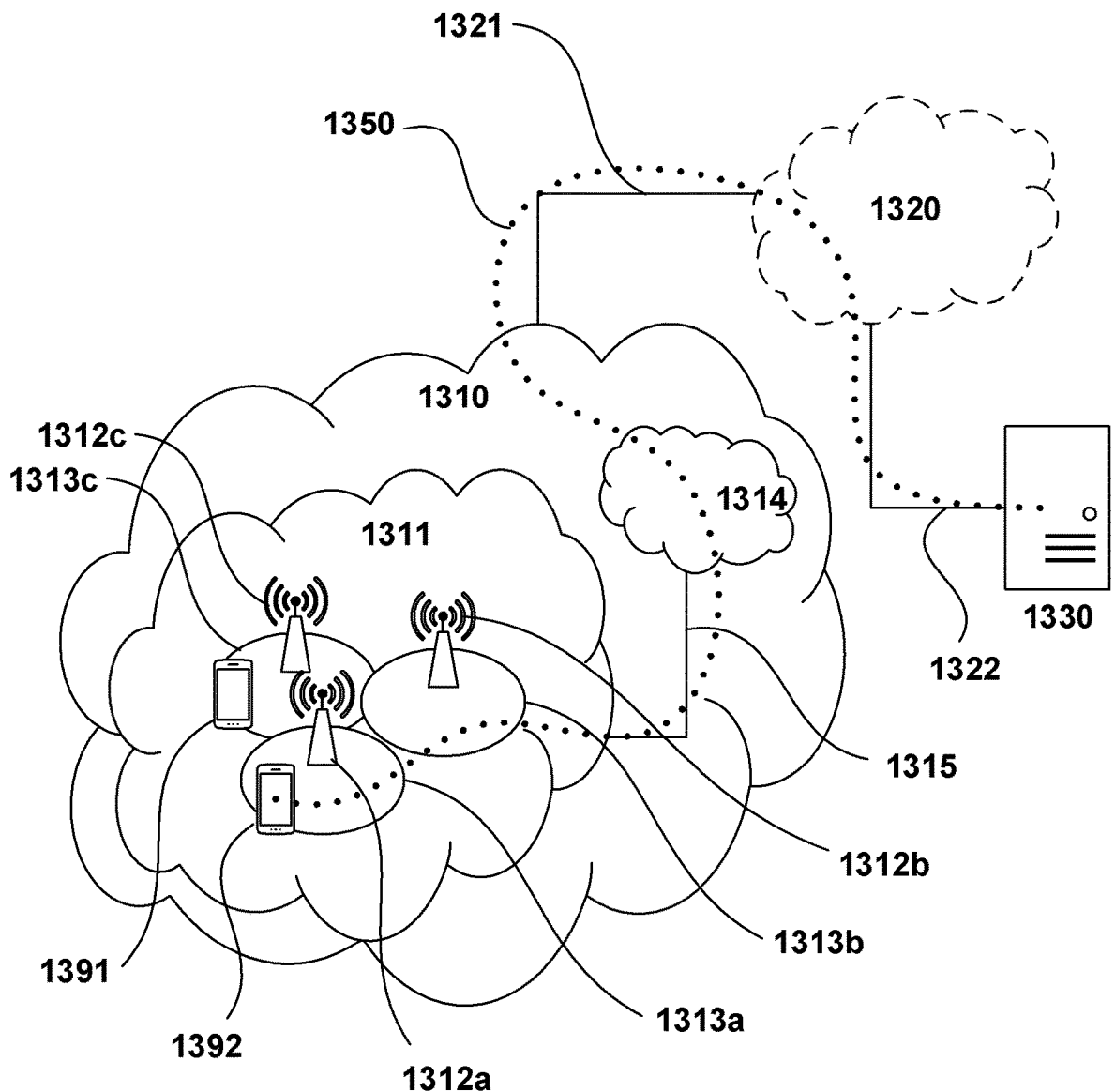
FIG. 13 is a schematic showing a telecommunication network connected via an intermediate network to a host computer in accordance with some embodiments.

FIG. 13 is a schematic showing a telecommunication network connected via an intermediate network to a host computer in accordance with some embodiments.

With reference to FIG. 13, in accordance with an embodiment, a communication system includes telecommunication network 1310, such as a 3GPP-type cellular network, which comprises access network 1311, such as a radio access network, and core network 1314. Access network 1311 comprises a plurality of base stations 1312a, 1312b, 1312c, such as NBs, eNBs, gNBs or other types of wireless access points, each defining a corresponding coverage area 1313a, 1313b, 1313c. Each base station 1312a, 1312b, 1312c is connectable to core network 1314 over a wired or wireless connection 1315. A first UE 1391 located in coverage area 1313c is configured to wirelessly connect to, or be paged by, the corresponding base station 1312c. A second UE 1392 in coverage area 1313a is wirelessly connectable to the corresponding base station 1312a. While a plurality of UEs 1391, 1392 are illustrated in this example, the disclosed embodiments are equally applicable to a situation where a sole UE is in the coverage area or where a sole UE is connecting to the corresponding base station 1312.

Telecommunication network 1310 is itself connected to host computer 1330, which may be embodied in the hardware and/or software of a standalone server, a cloud-implemented server, a distributed server or as processing resources in a server farm. Host computer 1330 may be under the ownership or control of a service provider, or may be operated by the service provider or on behalf of the service provider. Connections 1321 and 1322 between telecommunication network 1310 and host computer 1330 may extend directly from core network 1314 to host computer 1330 or may go via an optional intermediate network 1320. Intermediate network 1320 may be one of, or a combination of more than one of, a public, private or hosted network; intermediate network 1320, if any, may be a backbone network or the Internet; in particular, intermediate network 1320 may comprise two or more sub-networks (not shown).

The communication system of FIG. 13 as a whole enables connectivity between the connected UEs 1391, 1392 and host computer 1330. The connectivity may be described as an over-the-top (OTT) connection 1350. Host computer 1330 and the connected UEs 1391, 1392 are configured to communicate data and/or signaling via OTT connection 1350, using access network 1311, core network 1314, any intermediate network 1320 and possible further infrastructure (not shown) as intermediaries. OTT connection 1350 may be transparent in the sense that the participating communication devices through which OTT connection 1350 passes are unaware of routing of uplink and downlink communications. For example, base station 1312 may not or need not be informed about the past routing of an incoming downlink communication with data originating from host computer 1330 to be forwarded (e.g., handed over) to a connected UE 1391. Similarly, base station 1312 need not be aware of the future routing of an outgoing uplink communication originating from the UE 1391 towards the host computer 1330.

Figure 14:
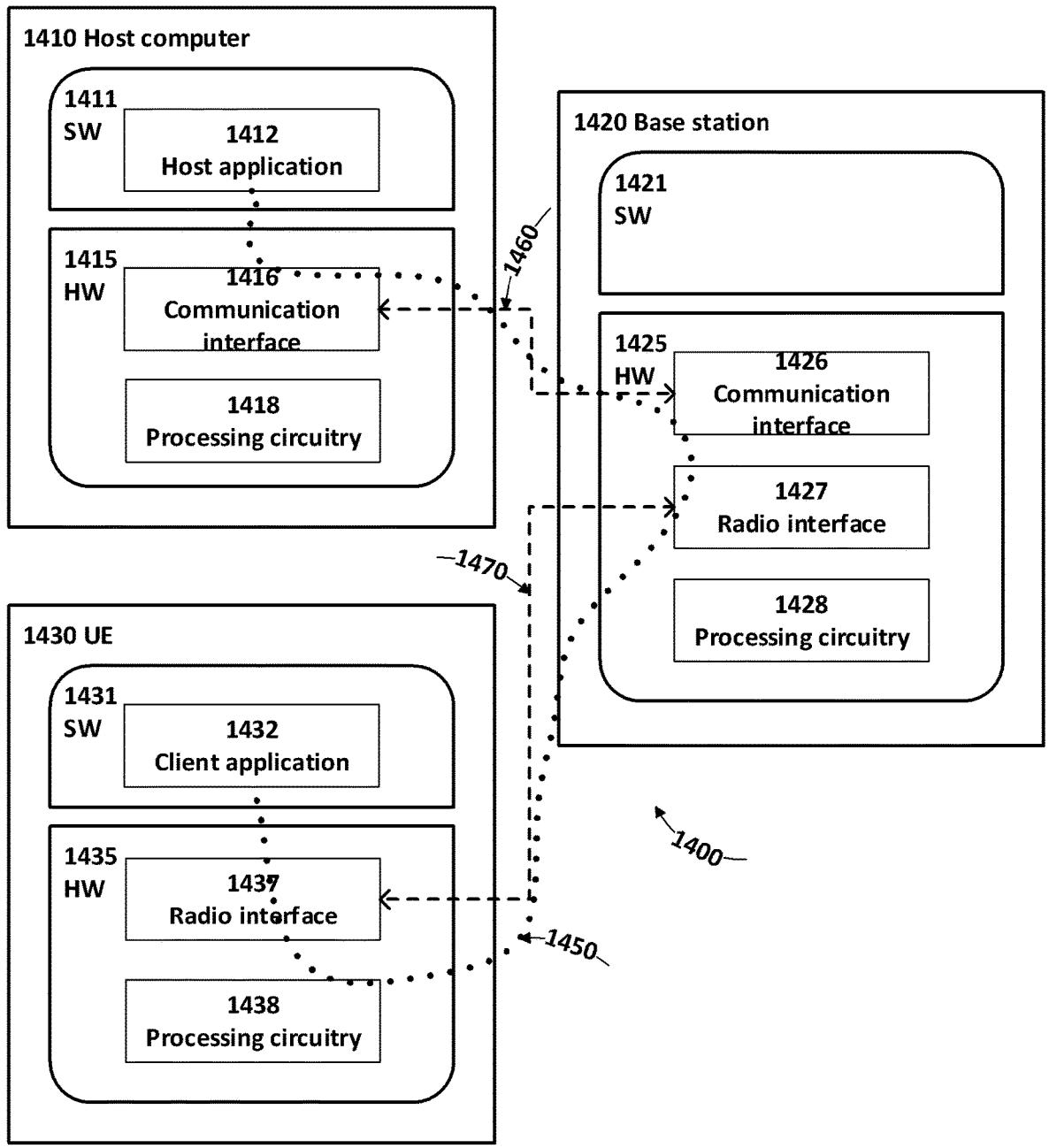
FIG. 14 is a schematic showing a host computer communicating via a base station with a user equipment over a partially wireless connection in accordance with some embodiments.

FIG. 14 is a schematic showing a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 14. In communication system 1400, host computer 1410 comprises hardware 1415 including communication interface 1416 configured to set up and maintain a wired or wireless connection with an interface of a different communication device of communication system 1400. Host computer 1410 further comprises processing circuitry 1418, which may have storage and/or processing capabilities. In particular, processing circuitry 1418 may comprise one or more programmable processors, application-specific integrated circuits, field programmable gate arrays or combinations of these (not shown) adapted to execute instructions. Host computer 1410 further comprises software 1411, which is stored in or accessible by host computer 1410 and executable by processing circuitry 1418. Software 1411 includes host application 1412. Host application 1412 may be operable to provide a service to a remote user, such as UE 1430 connecting via OTT connection 1450 terminating at UE 1430 and host computer 1410. In providing the service to the remote user, host application 1412 may provide user data which is transmitted using OTT connection 1450.

Communication system 1400 further includes base station 1420 provided in a telecommunication system and comprising hardware 1425 enabling it to communicate with host computer 1410 and with UE 1430. Hardware 1425 may include communication interface 1426 for setting up and maintaining a wired or wireless connection with an interface of a different communication device of communication system 1400, as well as radio interface 1427 for setting up and maintaining at least wireless connection 1470 with UE 1430 located in a coverage area (not shown in FIG. 14) served by base station 1420. Communication interface 1426 may be configured to facilitate connection 1460 to host computer 1410. Connection 1460 may be direct or it may pass through a core network (not shown in FIG. 14) of the telecommunication system and/or through one or more intermediate networks outside the telecommunication system. In the embodiment shown, hardware 1425 of base station 1420 further includes processing circuitry 1428, which may comprise one or more programmable processors, application-specific integrated circuits, field programmable gate arrays or combinations of these (not shown) adapted to execute instructions. Base station 1420 further has software 1421 stored internally or accessible via an external connection.

Communication system 1400 further includes UE 1430 already referred to. Its hardware 1435 may include radio interface 1437 configured to set up and maintain wireless connection 1470 with a base station serving a coverage area in which UE 1430 is currently located. Hardware 1435 of UE 1430 further includes processing circuitry 1438, which may comprise one or more programmable processors, application-specific integrated circuits, field programmable gate arrays or combinations of these (not shown) adapted to execute instructions. UE 1430 further comprises software 1431, which is stored in or accessible by UE 1430 and executable by processing circuitry 1438. Software 1431 includes client application 1432. Client application 1432 may be operable to provide a service to a human or non-human user via UE 1430, with the support of host computer 1410. In host computer 1410, an executing host application 1412 may communicate with the executing client application 1432 via OTT connection 1450 terminating at UE 1430 and host computer 1410. In providing the service to the user, client application 1432 may receive request data from host application 1412 and provide user data in response to the request data. OTT connection 1450 may transfer both the request data and the user data. Client application 1432 may interact with the user to generate the user data that it provides.

It is noted that host computer 1410, base station 1420 and UE 1430 illustrated in FIG. 14 may be similar or identical to host computer 1330, one of base stations 1312*a*, 1312*b*, 1312*c* and one of UEs 1391, 1392 of FIG. 13, respectively. This is to say, the inner workings of these entities may be as shown in FIG. 14 and independently, the surrounding network topology may be that of FIG. 13.

In FIG. 14, OTT connection 1450 has been drawn abstractly to illustrate the communication between host computer 1410 and UE 1430 via base station 1420, without explicit reference to any intermediary devices and the precise routing of messages via these devices. Network infrastructure may determine the routing, which it may be configured to hide from UE 1430 or from the service provider operating host computer 1410, or both. While OTT connection 1450 is active, the network infrastructure may further take decisions by which it dynamically changes the routing (e.g., on the basis of load balancing consideration or reconfiguration of the network).

Wireless connection 1470 between UE 1430 and base station 1420 is in accordance with the teachings of the embodiments described throughout this disclosure. One or more of the various embodiments improve the performance of OTT services provided to UE 1430 using OTT connection 1450, in which wireless connection 1470 forms the last segment. More precisely, the teachings of these embodiments may improve the latency, and power consumption for a reactivation of the network connection, and thereby provide benefits, such as reduced user waiting time, enhanced rate control.

A measurement procedure may be provided for the purpose of monitoring data rate, latency and other factors on which the one or more embodiments improve. There may further be an optional network functionality for reconfiguring OTT connection 1450 between host computer 1410 and UE 1430, in response to variations in the measurement results. The measurement procedure and/or the network functionality for reconfiguring OTT connection 1450 may be implemented in software 1411 and hardware 1415 of host computer 1410 or in software 1431 and hardware 1435 of UE 1430, or both. In embodiments, sensors (not shown) may be deployed in or in association with communication devices through which OTT connection 1450 passes; the sensors may participate in the measurement procedure by supplying values of the monitored quantities exemplified above, or supplying values of other physical quantities from which software 1411, 1431 may compute or estimate the monitored quantities. The reconfiguring of OTT connection 1450 may include message format, retransmission settings, preferred routing etc.; the reconfiguring need not affect base station 1420, and it may be unknown or imperceptible to base station 1420. Such procedures and functionalities may be known and practiced in the art. In certain embodiments, measurements may involve proprietary UE signaling facilitating host computer 1410's measurements of throughput, propagation times, latency and the like. The measurements may be implemented in that software 1411 and 1431 causes messages to be transmitted, in particular empty or 'dummy' messages, using OTT connection 1450 while it monitors propagation times, errors etc.

Figure 15:
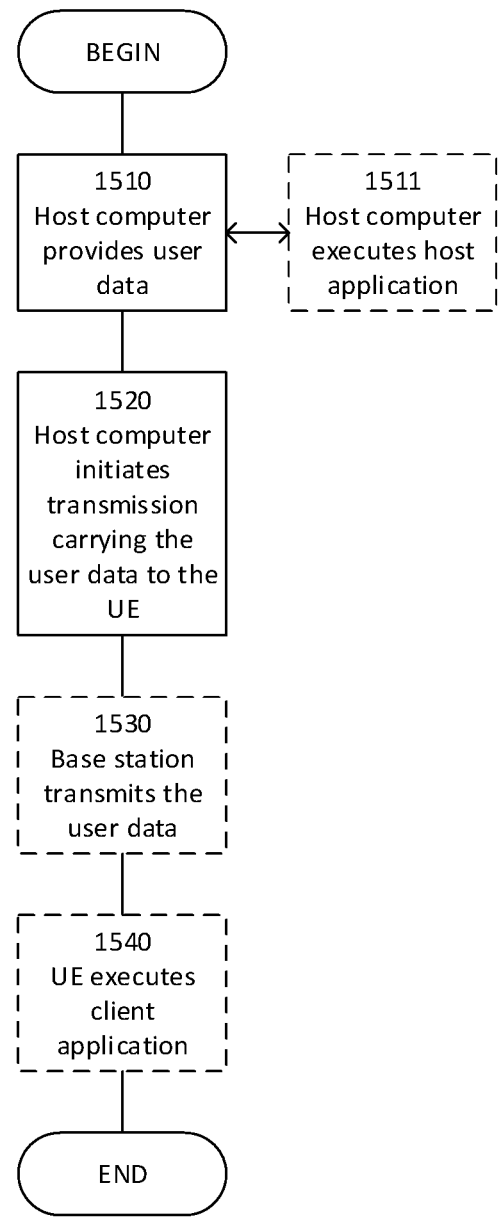
FIG. 15 is a schematic showing methods implemented in a communication system including a host computer, a base station and a user equipment in accordance with some embodiments.

FIG. 15 is a schematic showing methods implemented in a communication system including a host computer, a base station and a user equipment in accordance with some embodiments.

The communication system includes a host computer, a base station and a UE which may be those described with reference to FIGS. 13 and 14. For simplicity of the present disclosure, only drawing references to FIG. 15 will be included in this section. In step 1510, the host computer provides user data. In substep 1511 (which may be optional) of step 1510, the host computer provides the user data by executing a host application. In step 1520, the host computer initiates a transmission carrying the user data to the UE. In step 1530 (which may be optional), the base station transmits to the UE the user data which was carried in the transmission that the host computer initiated, in accordance with the teachings of the embodiments described throughout this disclosure. In step 1540 (which may also be optional), the UE executes a client application associated with the host application executed by the host computer.

Figure 16:
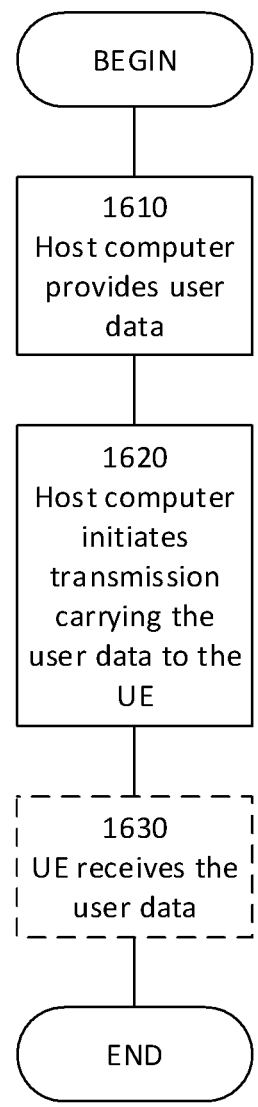
FIG. 16 is a schematic showing methods implemented in a communication system including a host computer, a base station and a user equipment in accordance with some embodiments.

FIG. 16 is a schematic showing methods implemented in a communication system including a host computer, a base station and a user equipment in accordance with some embodiments.

The communication system includes a host computer, a base station and a UE which may be those described with reference to FIGS. 13 and 14. For simplicity of the present disclosure, only drawing references to FIG. 16 will be included in this section. In step 1610 of the method, the host computer provides user data. In an optional substep (not shown) the host computer provides the user data by executing a host application. In step 1620, the host computer initiates a transmission carrying the user data to the UE. The transmission may pass via the base station, in accordance with the teachings of the embodiments described throughout this disclosure. In step 1630 (which may be optional), the UE receives the user data carried in the transmission.

Figure 17:
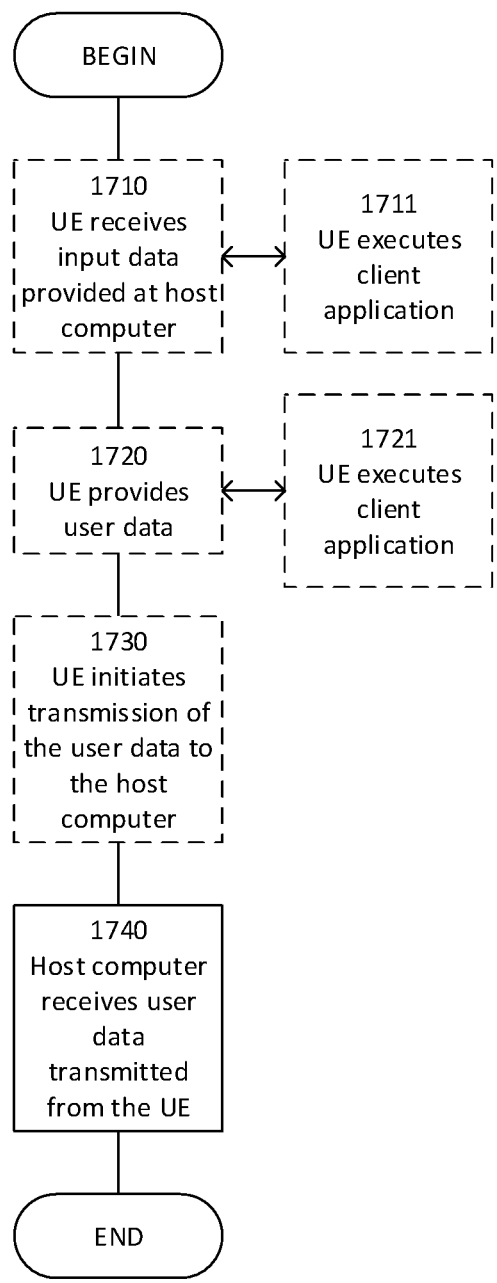
FIG. 17 is a schematic showing methods implemented in a communication system including a host computer, a base station and a user equipment in accordance with some embodiments.

FIG. 17 is a schematic showing methods implemented in a communication system including a host computer, a base station and a user equipment in accordance with some embodiments.

The communication system includes a host computer, a base station and a UE which may be those described with reference to FIGS. 13 and 14. For simplicity of the present disclosure, only drawing references to FIG. 17 will be included in this section. In step 1710 (which may be optional), the UE receives input data provided by the host computer. Additionally or alternatively, in step 1720, the UE provides user data. In substep 1721 (which may be optional) of step 1720, the UE provides the user data by executing a client application. In substep 1711 (which may be optional) of step 1710, the UE executes a client application which provides the user data in reaction to the received input data provided by the host computer. In providing the user data, the executed client application may further consider user input received from the user. Regardless of the specific manner in which the user data was provided, the UE initiates, in substep 1730 (which may be optional), transmission of the user data to the host computer. In step 1740 of the method, the host computer receives the user data transmitted from the UE, in accordance with the teachings of the embodiments described throughout this disclosure.

Figure 18:
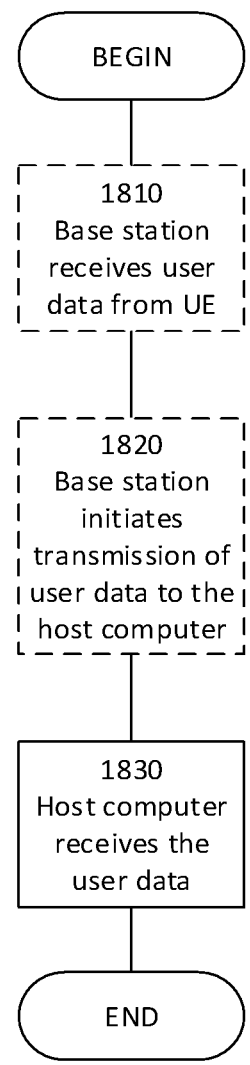
FIG. 18 is a schematic showing methods implemented in a communication system including a host computer, a base station and a user equipment in accordance with some embodiments.

FIG. 18 is a schematic showing methods implemented in a communication system including a host computer, a base station and a user equipment in accordance with some embodiments.

The communication system includes a host computer, a base station and a UE which may be those described with reference to FIGS. 13 and 14. For simplicity of the present disclosure, only drawing references to FIG. 18 will be included in this section. In step 1810 (which may be optional), in accordance with the teachings of the embodiments described throughout this disclosure, the base station receives user data from the UE. In step 1820 (which may be optional), the base station initiates transmission of the received user data to the host computer. In step 1830 (which may be optional), the host computer receives the user data carried in the transmission initiated by the base station.

In general, the various exemplary embodiments of the present disclosure may be implemented in hardware or special purpose circuits, software, logic or any combination thereof. For example, some aspects may be implemented in hardware, while other aspects may be implemented in firmware or software that may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may include circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by those skilled in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

The invention claimed is:

1. A method performed at a network node, the method comprising:
    determining a coverage requirement for a beam;
    determining a coverage area for the beam based on the determined coverage requirement;
    determining a power requirement for the beam based on the determined coverage area; and
    tuning the beam based on the determined power requirement.

2. The method of claim 1, wherein
    the coverage requirement comprises a traffic load to be supported by the beam, and
    the traffic load is determined by a prediction based on historic data.

3. The method of claim 2, wherein the prediction is made by an artificial intelligence algorithm.

4. The method of claim 2, wherein
    the prediction is made by Long Short-Term Memory (LSTM) neural network model.

5. The method of claim 4, wherein
    the traffic load is determined based on a mapping relationship between the traffic load and a plurality of output parameters of the LSTM neural network model.

6. The method of claim 5, wherein
    the output parameters of the LSTM neural network model comprise at least one of: a utilization of physical resource block (PRB), a number of radio resource control (RRC) connections, or a throughput.

7. The method of claim 5, wherein
    a number of input parameters of the LSTM neural network model is not less than a number of output parameters of the LSTM neural network model.

8. The method of claim 1, wherein
    the beam is associated with a plurality of geographic grids covered by the network node,
    the coverage requirement is determined in the plurality of geographic grids,
    the coverage area for the beam comprises at least one geographic grid requiring a coverage of the beam, and determining the power requirement comprises:
- determining an outside edge grid; and
- determining the power requirement based on a mapping relationship between the outside edge grid and the power requirement.

9. The method of claim 8, wherein the power requirement is determined based on the outside edge grid, an amount of connected terminal devices, and positions of the connected terminal devices.

10. The method of claim 9, wherein the power requirement is determined to at least be able to cover both of the outside edge grid and the connected terminal devices.

11. The method of claim 1, wherein
- the network node is a macro base station in a heterogeneous network, and
- the beam is generated by at least one of superposed base stations which are managed by the macro base station.

12. The method of claim 1, wherein the beam is tuned for a beam recovery procedure.

13. A non-transitory computer-readable storage medium storing instructions which when executed by at least one processor, cause the at least one processor to perform the method of claim 1.

14. The method of claim 1, wherein the power requirement for the beam is determined based on at least the determined coverage area.

15. A network node, comprising:
- a processor; and
- a memory, the memory containing instructions executable by the processor, wherein the network node is configured to:
- determine a coverage requirement for a beam;
- determine a coverage area for the beam based on the determined coverage requirement;
- determine a power requirement for the beam based on the determined coverage area; and
- tune the beam based on the determined power requirement.

16. The network node of claim 15, wherein
- the coverage requirement comprises a traffic load to be supported by the beam, and
- the traffic load is determined by a prediction based on historic data.

17. The network node of claim 16, wherein the prediction is made by an artificial intelligence algorithm.

18. The method of claim 16, wherein
- the prediction is made by Long Short-Term Memory (LSTM) neural network model, and
- the traffic load is determined based on a mapping relationship between the traffic load and a plurality of output parameters of the LSTM neural network model.

19. The network node of claim 15, wherein
the beam is associated with a plurality of geographic grids covered by the network node,
the coverage requirement is determined in the plurality of geographic grids,
the coverage area for the beam comprises at least one geographic grid requiring a coverage of the beam, and
determining the power requirement comprises:
determining an outside edge grid; and
determining the power requirement based on a mapping relationship between the outside edge grid and the power requirement.

20. The network node of claim 15, wherein
the network node is a macro base station in a heterogeneous network, and
the beam is generated by at least one of superposed base stations which are managed by the macro base station.

* * * * *